United States Patent
Agranonik et al.

(10) Patent No.: US 12,301,615 B2
(45) Date of Patent: May 13, 2025

(54) ORGANIZATION-LEVEL RANSOMWARE INCRIMINATION

(71) Applicant: Microsoft Technology Licensing, LLC, Redmond, WA (US)

(72) Inventors: Arie Agranonik, Herzliya (IL); Shay Kels, Givatayim (IL); Amir Rubin, Vancouver (CA); Charles Edouard Elie Bettan, Tel Aviv (IL); Yair Tsarfaty, Nahariya (IL); Itai Kollmann Dekel, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 319 days.

(21) Appl. No.: 17/727,759

(22) Filed: Apr. 24, 2022

(65) Prior Publication Data
US 2023/0344860 A1 Oct. 26, 2023

(51) Int. Cl.
*H04L 29/06* (2006.01)
*G06N 3/04* (2023.01)
*H04L 9/40* (2022.01)

(52) U.S. Cl.
CPC ........... *H04L 63/145* (2013.01); *G06N 3/04* (2013.01); *H04L 63/1416* (2013.01);
(Continued)

(58) Field of Classification Search
CPC ............... H04L 63/145; H04L 63/1416; H04L 63/1425; H04L 63/1433; H04L 63/20;
(Continued)

(56) References Cited

U.S. PATENT DOCUMENTS 11,503,075 B1 * 11/2022 Sirianni .............. H04L 63/1416
11,509,682 B1 * 11/2022 Paget .................. H04L 63/1433
(Continued)

FOREIGN PATENT DOCUMENTS

WO 2020040878 A1 2/2020

OTHER PUBLICATIONS

"International Search Report and Written Opinion Issued in PCT Application No. PCT/US2023/015718", Mailed Date: Jun. 23, 2023, 15 Pages.

(Continued)

*Primary Examiner* — Maung T Lwin
*Assistant Examiner* — Judy Bazna
(74) *Attorney, Agent, or Firm* — Ogilvie Law Firm

(57) ABSTRACT

Some embodiments help protect an organization against ransomware attacks by combining incrimination logics. An organizational-level incrimination logic helps detect alert spikes across many machines, which collectively indicate an attack. Graph-based incrimination logics help detect infestations of even a few machines, and local incrimination logics focus on protecting respective individual machines. Graph-based incrimination logics may compare monitored system graphs to known ransomware attack graphs. Graphs may have devices as nodes and device network connectivity, repeated files, repeated processes or actions, or other connections as edges. Statistical analyses and machine learning models may be employed as incrimination logics. Search logics may find additional incrimination candidates that would otherwise evade detection, based on files, processes, IP addresses, devices, accounts, or other computational entities previously incriminated. Incrimination engine results are forwarded to endpoint protection systems, intrusion protection systems, authentication controls, or other (Continued)

intervention mechanisms to enhance monitored system security.

20 Claims, 9 Drawing Sheets

(52) U.S. Cl.
CPC ...... *H04L 63/1425* (2013.01); *H04L 63/1433* (2013.01); *H04L 63/20* (2013.01)

(58) Field of Classification Search
CPC ... H04L 63/1408; H04L 63/1466; G06N 3/04; G06N 3/045; G06N 5/01; G06N 3/02; G06N 20/00; G06N 3/08; G06F 21/57; G06F 21/561; G06F 21/554
See application file for complete search history.

(56) References Cited

U.S. PATENT DOCUMENTS

| | | | |
|---|---|---|---|
| 2006/0236392 A1* | 10/2006 | Thomas | G06F 21/577 726/23 |
| 2015/0180890 A1 | 6/2015 | Ronen et al. | |
| 2015/0371044 A1* | 12/2015 | Horne | G06F 21/577 726/25 |
| 2017/0078324 A1* | 3/2017 | Bordawekar | H04L 63/1458 |
| 2018/0004948 A1 | 1/2018 | Martin et al. | |
| 2019/0173893 A1* | 6/2019 | Muddu | G06F 16/9024 |
| 2020/0042700 A1 | 2/2020 | Li et al. | |
| 2020/0137083 A1* | 4/2020 | Chen | G06F 16/9024 |
| 2020/0213322 A1* | 7/2020 | Anand | H04L 63/0876 |
| 2020/0389496 A1 | 12/2020 | Xuan | |
| 2021/0406365 A1 | 12/2021 | Neil et al. | |
| 2021/0406368 A1 | 12/2021 | Agranonik et al. | |
| 2022/0159034 A1* | 5/2022 | Volkov | G06F 21/53 |
| 2023/0325292 A1* | 10/2023 | Ardel | G05B 23/0254 702/183 |

OTHER PUBLICATIONS

Danai Koutra, et al., "Algorithms for Graph Similarity and Subgraph Matching", retrieved from << https://www.cs.cmu.edu/~jingx/docs/DBreport.pdf >>, Dec. 4, 2011, 50 pages.

Kyle Johnson, "3 ransomware detection techniques to catch an attack", retrieved from <<https://www.techtarget.com/searchsecurity/feature/3-ransomware-detection-techniques-to-catch-an-attack>>, no later than Apr. 8, 2022, 5 pages.

Francesco Casalegno, "Graph Convolutional Networks—Deep Learning on Graphs", retrieved from <<https://towardsdatascience.com/graph-convolutional-networks-deep-99d7fee5706f>>, Jan. 22, 2021, 10 pages.

Ruofan Wang and Kelly Kang, "AI-driven adaptive protection against human-operated ransomware", retrieved from <<https://www.microsoft.com/security/blog/2021/11/15/ai-driven-adaptive-protection-against-human-operated-ransomware/?msclkid=28b48172af3d11ecacf2e5166e7d5a12>>, Nov. 15, 2021, 11 pages.

Sylvie Liu, "What's new: Fusion Detection for Ransomware", retrieved from <<https://techcommunity.microsoft.com/t5/microsoft-sentinel-blog/what-s-new-fusion-detection-for-ransomware/ba-p/2621373?msclkid=28b5b1f9af3d11eca985e370e10ccacf>>, Aug. 9, 2021, 6 pages.

Justin Carroll, et al., "Inside Microsoft 365 Defender: Attack modeling for finding and stopping lateral movement", retrieved from <<https://www.microsoft.com/security/blog/2020/06/10/the-science-behind-microsoft-threat-protection-attack-modeling-for-finding-and-stopping-evasive-ransomware/?msclkid=28b4bc73af3d11ecbf717a89e2a8257c>>, Jun. 10, 2020, 16 pages.

Eric Avena, "The science behind Microsoft Threat Protection: Attack modeling for finding and stopping evasive ransomware", retrieved from <<https://argonsys.com/microsoft-cloud/library/the-science-behind-microsoft-threat-protection-attack-modeling-for-finding-and-stopping-evasive-ransomware/?msclkid=28b60074af3d11ec960acce47a4f0d9f>>, Jun. 10, 2020, 8 pages.

Subash Poudyal, et al., "A Framework for Analyzing Ransomware using Machine Learning", retrieved from <<https://www.researchgate.net/publication/334559366_A_Framework_for_Analyzing_Ransomware_using_Machine_Learning>>, Jan. 2019, 9 pages.

"The growing threat of ransomware", retrieved from <<https://blogs.microsoft.com/on-the-issues/2021/07/20/the-growing-threat-of-ransomware/?msclkid=28b5ddc4af3d11ecad546757ccb5a953>>, Jul. 20, 2021, 14 pages.

"Human-operated ransomware attacks: A preventable disaster", retrieved from <<https://www.microsoft.com/security/blog/2020/03/05/human-operated-ransomware-attacks-a-preventable-disaster/>>, Mar. 5, 2020, 29 pages.

"Human-operated ransomware", retrieved from <<https://docs.microsoft.com/en-us/security/compass/human-operated-ransomware>>, Feb. 18, 2022, 7 pages.

Vangel, et al., "Feedback-loop Blocking", Retrieved From: https://learn.microsoft.com/en-us/microsoft-365/security/defender-endpoint/feedback-loop-blocking?view=o365-worldwide, Jul. 19, 2023, 2 Pages.

* cited by examiner

ORGANIZATION-LEVEL RANSOMWARE INCRIMINATION

BACKGROUND

Attacks on a computing system may take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within the computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made against a computing system. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place. Some defenses might not be feasible or cost-effective for the computing system. However, improvements in cybersecurity remain possible, and worth pursuing.

SUMMARY

Some embodiments described herein address technical challenges related to the detection of ransomware that targets more than a few machines of a hospital, school, business, public service agency, or other organization. Such organization-level ransomware attacks are more coordinated, more dangerous, and more technologically complex than ransomware attacks against individual machines. Protecting against organization-level ransomware attacks poses correspondingly difficult technical challenges.

Some embodiments combine an organization-level incrimination logic with at least one sub-organization-level incrimination logic. The organization-level incrimination logic detects a spike in cybersecurity alerts which occur collectively on a substantial amount of the machines of the organization, e.g., at least twenty percent of the organization's machines or at least ten of the organization's machines, or some other specified number of machines. The sub-organization-level incrimination logic detects a cybersecurity anomaly on at least one of the organization's machines. In operation, these example embodiments collect an incrimination candidate based on an alert, and submit the candidate to the incrimination logics. Logics may be implemented in software, or software and hardware, or hardware alone. If the incrimination logics collectively boost an incrimination confidence past a specified threshold, then these embodiments mark each entity specified in the alert as incriminated, and notify an intervention mechanism so it can take action, e.g., by blocking, deleting, or de-authenticating the incriminated entity.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
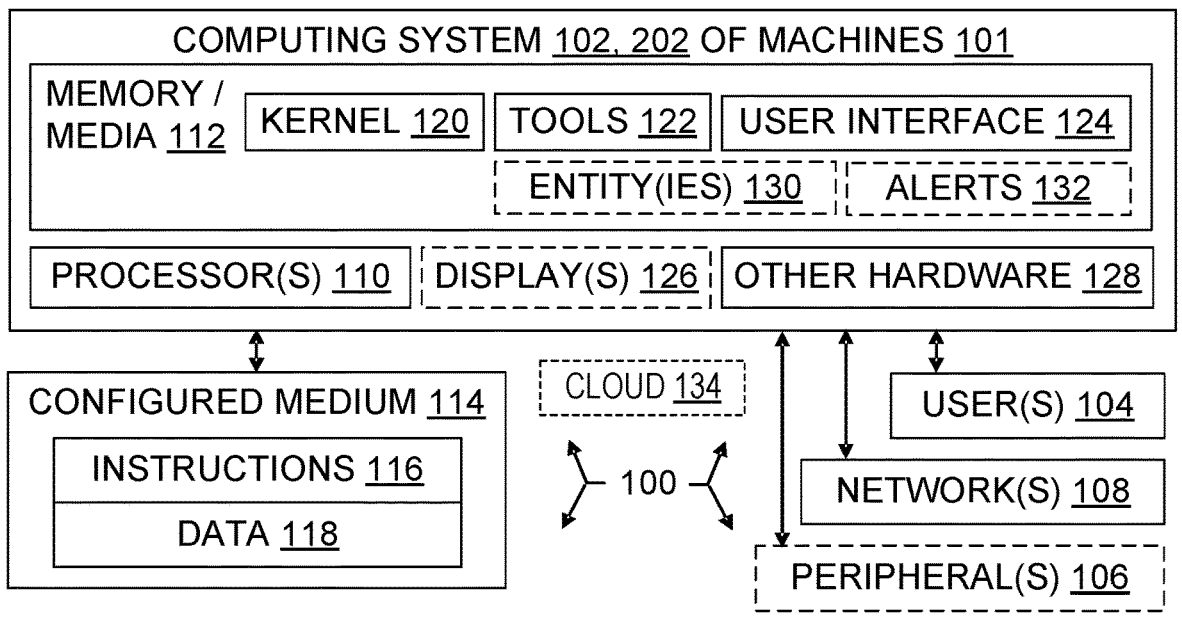
FIG. 1 is a diagram illustrating aspects of computer systems and also illustrating configured storage media.

Innovations may expand beyond their origins, but understanding an innovation's origins can help one more fully appreciate the innovation. In the present case, some teachings described herein were motivated by technical challenges arising from ongoing efforts by Microsoft innovators to help protect hospitals, schools, businesses, public service agencies, and other organizations against increasingly complex ransomware attacks.

Some older ransomware attacks were opportunistic, targeting any accessible machine of any person or organization, as opposed to targeting multiple machines of a particular organization. Older attacks targeted an individual person by way of their machine, and thus often imposed ransoms around $2000 or the equivalent in other currencies.

More recent ransomware attacks have been different. Instead of targeting an individual person in a localized attack, they target an organization by gaining unauthorized access to tens or hundreds of the organization's machines. Organizations then face demands for large ransoms, e.g., hundreds of thousands of dollars, or even millions of dollars. Before asserting these heavy ransom demands, attackers use technical procedures such as lateral movement and privilege escalation to silently spread the malware; these technical procedures were rarely if ever used in the older attacks against individuals. Attackers also attempt to compensate for organizational data backups and to leverage organizational reputations by not merely encrypting an organization's data, but also by exfiltrating the data and threatening to publish it if the ransom is not paid. Although organization-level ransomware attacks are often in pursuit of money, political motives may also be behind an organization-level attack.

Organization-level ransomware attacks are sometimes also referred to as "human-operated ransomware attacks". Because of their scale and their complexity, organization-level ransomware attacks often involve coordinated efforts among multiple human attackers, e.g., the personnel of a criminal enterprise or a nation state.

Microsoft innovators explored various ways to detect and mitigate such organization-level ransomware attacks. The innovators recognized that existing security tools designed to protect an individual machine could still be helpful, but were not enough on their own to reliably detect organization-level ransomware attacks.

In short, organization-level ransomware attacks pose a problem: how to reliably protect an organization against ransomware that is attacking multiple machines of the organization in a coordinated way. This problem may be refined into related technical challenges, such as:

1. How to detect organization-level ransomware attacks, which are often designed to spread malware among many machines without detection, and only then present a ransomware demand.
2. Whether to leverage existing tools for the detection of ransomware that targets an individual machine, and if so, how to leverage these existing tools or other tools that focus on protecting an individual machine as oppose to protecting an organization overall.

Some embodiments described herein address these challenges by combining organizational-level incrimination logic with sub-organizational-level incrimination logic. The organizational-level incrimination logic watches for collective signs of compromise from a group of machines, such as a spike in alerts across ten or more machines viewed as a group. Some of the sub-organizational-level incrimination logics watch for signs of compromise from a smaller number of machines (as few as two), while other sub-organizational-level incrimination logics watch for compromise of an individual machine. Organization-level ransomware attacks may be detected, for example, by combining results from organizational-level incrimination logic with results from sub-organizational-level incrimination logic. Within this framework, tools that focus on protecting an individual machine may serve as sub-organizational-level incrimination logic.

Beneficially, sub-organizational-level incrimination logic may aid the detection of organization-level ransomware attacks, without being entirely relied on for that purpose. Also, organizational-level incrimination logic may detect an attack during a malware spreading phase, before most of an organization's machines have been compromised. These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. The user interface 124 may support interaction between an embodiment and one or more human users. The user interface 124 may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 134 and/or other network 108 via network interface equipment, for example.

Each computer system 102 includes at least one processor 110. The computer system 102, like other suitable systems, also includes one or more computer-readable storage media 112, also referred to as computer-readable storage devices 112. Tools 122 may include software apps on mobile devices 102 or workstations 102 or servers 102, as well as APIs, browsers, or webpages and the corresponding software for protocols such as HTTPS, for example.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, functionality 204 could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
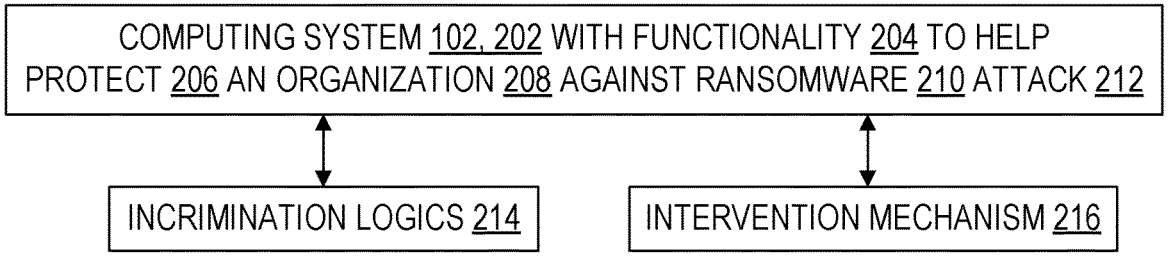
FIG. 2 is a diagram illustrating aspects of a computing system which has one or more of the organizational ransomware protection enhancements taught herein.

FIG. 2 illustrates a computing system 102 configured by one or more of the organizational ransomware protection enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
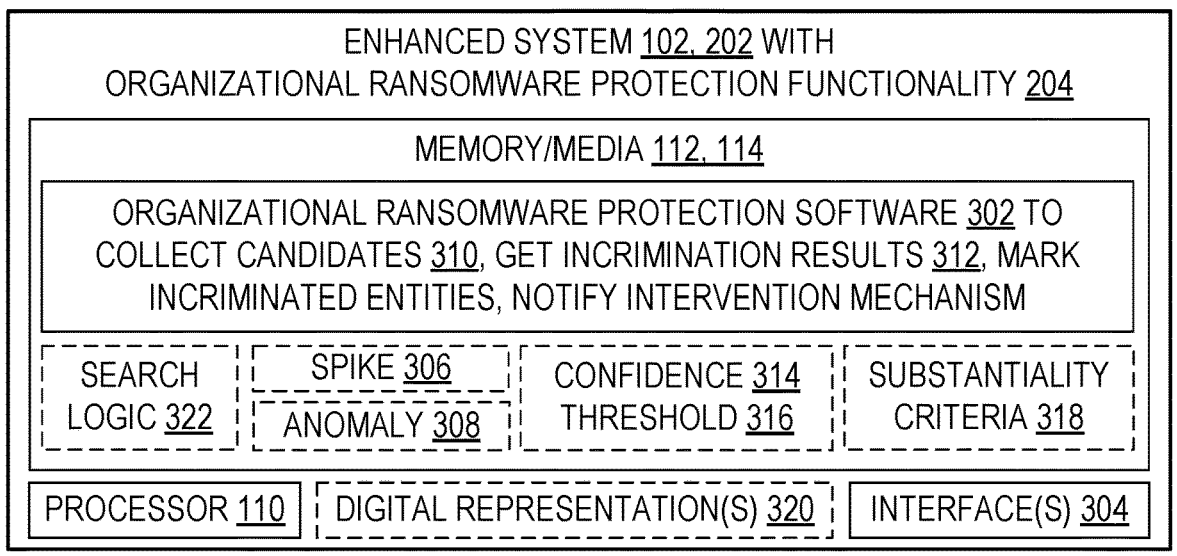
FIG. 3 is a block diagram illustrating an enhanced system configured with functionality to help protect organizations against ransomware, as opposed to protecting only a particular machine.

FIG. 3 illustrates an enhanced system 202 which is configured with organizational ransomware protection software 302 to provide functionality 204. Software 302 and other FIG. 3 items are discussed at various points herein, and additional details regarding them are provided in the discussion of a List of Reference Numerals later in this disclosure document.

Figure 4:
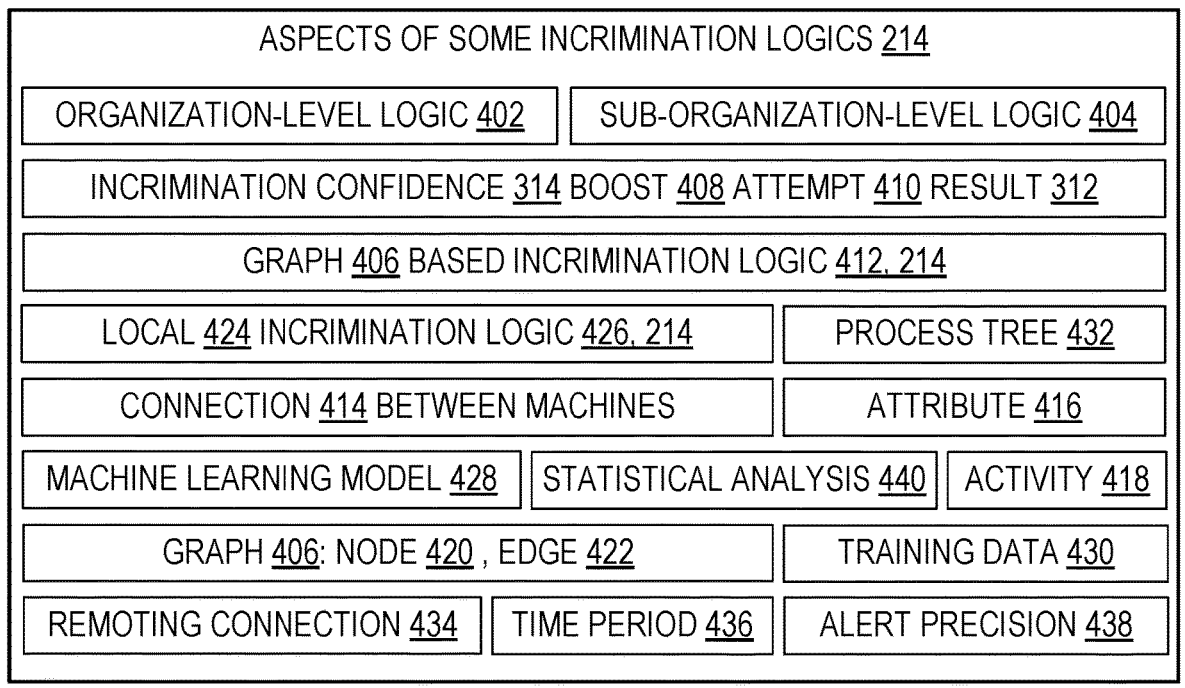
FIG. 4 is a block diagram illustrating aspects of some entity incrimination logics.

FIG. 4 shows aspects of some incrimination logics 214. This is not a comprehensive summary of all incrimination logics 214, or a comprehensive summary of all aspects of an environment 100 or system 202 or other context of incrimination logics 214, or a comprehensive summary of all entity incrimination mechanisms for potential use in or with a system 102. FIG. 4 items are discussed at various points herein, and additional details regarding them are provided in the discussion of a List of Reference Numerals later in this disclosure document.

Figure 5:
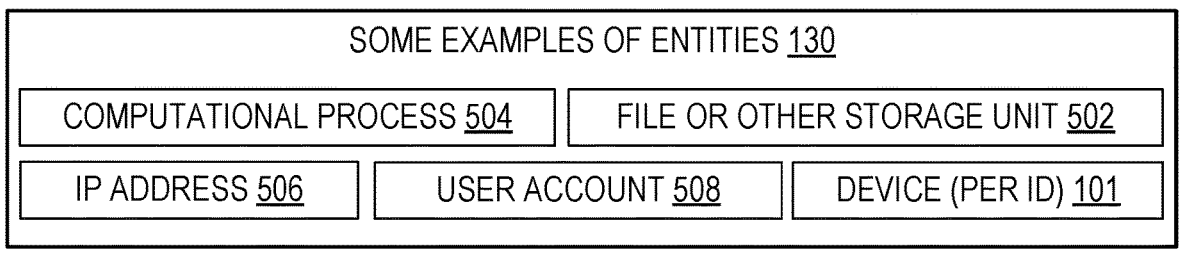
FIG. 5 is a block diagram illustrating some examples of entities.

FIG. 5 shows examples of some entities 130. This is not a comprehensive summary of all entities 130 or their aspects. FIG. 5 items are discussed at various points herein, and additional details regarding them are provided in the discussion of a List of Reference Numerals later in this disclosure document.

Figure 6:
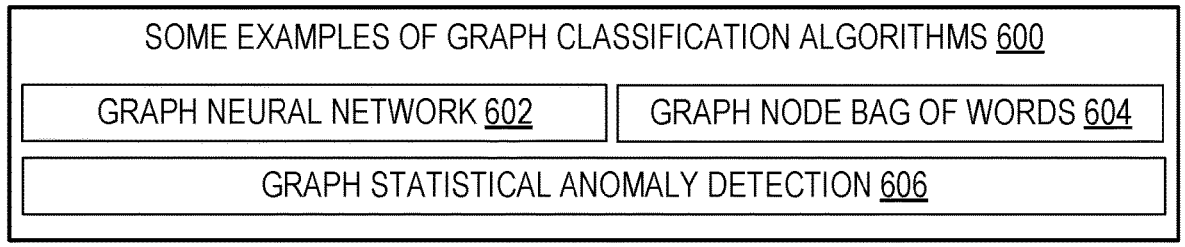
FIG. 6 is a block diagram illustrating some examples of graph classification algorithms.
Figure 7:
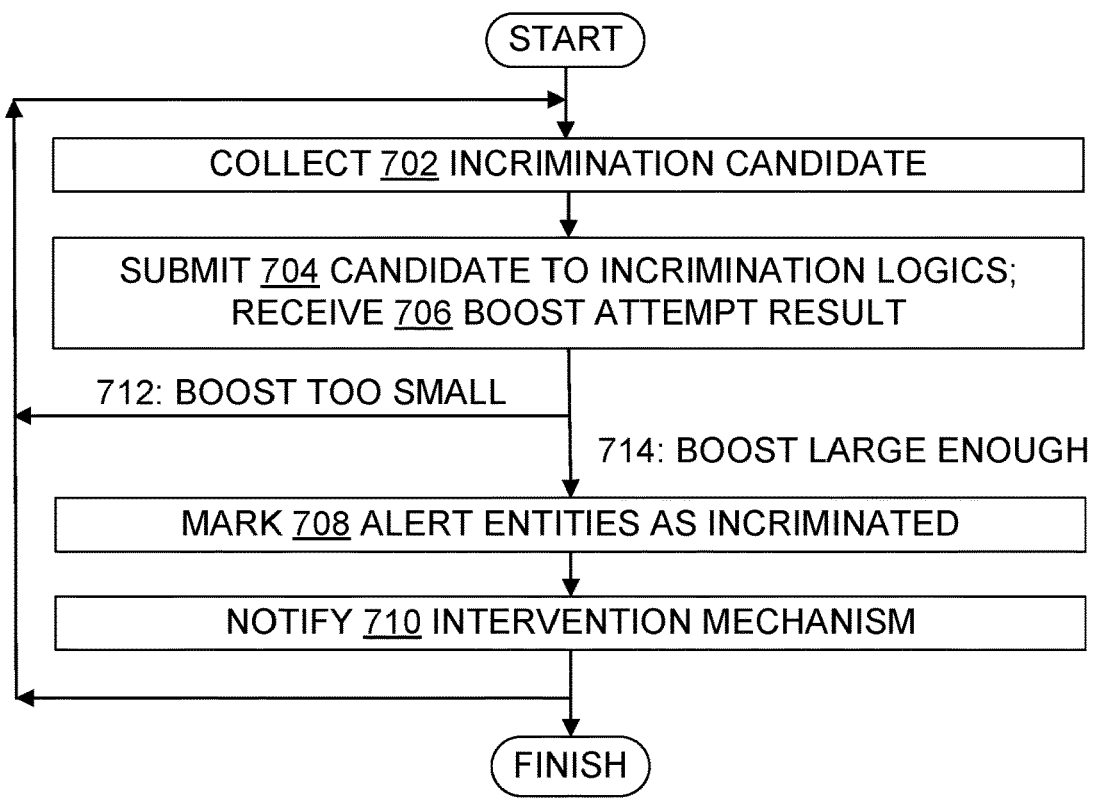
FIG. 7 is a flowchart illustrating steps in some methods for protecting an organization overall against ransomware.
Figure 8:
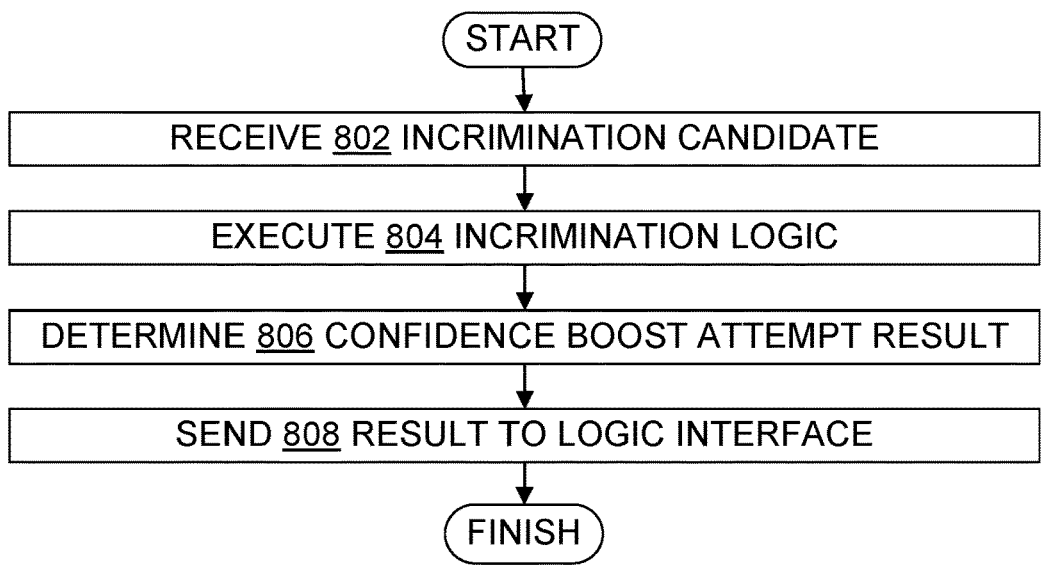
FIG. 8 is a flowchart illustrating steps in some incrimination logic methods.

FIG. 6 shows examples of some graph classification algorithms 600. This is not a comprehensive summary of all graph classification algorithms 600, or a comprehensive summary of all classification mechanisms for potential use in or with a system 202. FIG. 6 items are discussed at various points herein, and additional details regarding them are provided in the discussion of a List of Reference Numerals later in this disclosure document.

In some embodiments, the enhanced system 202 may be networked through an interface 304. An interface 304 may include hardware such as network interface cards, software such as network stacks, APIs, or sockets, combination items such as network connections, or a combination thereof.

In some embodiments, an enhanced system 202 includes a computing system 202 which is configured to help protect 206 an organization 208 against a ransomware 210 attack 212 that targets multiple machines 101 of the organization. The enhanced system 202 includes a digital memory 112 and a processor 110 in operable communication with the memory. In a given embodiment, the digital memory 112 may be volatile or nonvolatile or a mix.

In this example, the embodiments also include an organization-level incrimination logic 402, 214 which includes computing hardware 102 configured by software 302 to detect a spike 306 in cybersecurity alerts 132 which occur collectively on a substantial amount of the machines 101 of the organization, the substantial amount including, e.g., a specified number of machines of the organization, or at least twenty percent of the machines of the organization, or at least ten machines of the organization. More generally, a substantiality criterion 318 for spike detection is satisfied when at least a specified percent of the machines of the organization or at least a specified number of machines of the organization, or both, are in a group of machines for which a spike is detected.

In this example, the embodiments also include at least one sub-organization-level incrimination logic 404, 214 which includes computing hardware 102 configured by software 302 to detect a cybersecurity anomaly 308 on at least one machine of the organization.

In this example, the embodiments also include an incrimination logics interface 304 in operable digital communication with the incrimination logics 402 and 404.

In this example, the processor 110 is configured to perform organizational ransomware protection steps, i.e., to execute organizational protection against ransomware. This includes (a) collecting 702 at least one incrimination candidate 310 based on at least one cybersecurity alert 132 specifying at least one entity 130, (b) submitting 704 at least one collected incrimination candidate 310 to the incrimination logics interface 304 and in response receiving 706 an incrimination boost attempt 410 result 312, (c) when the incrimination boost attempt result 312 does not indicate a boost 408 in an incrimination confidence 314 past a specified threshold 316, then returning 712 to the collecting, (d) when the incrimination boost attempt result 312 indicates a boost 408 in the incrimination confidence 314 past the specified threshold 316, marking 708 each entity 130 specified in the at least one cybersecurity alert 132 as an incriminated 1102 entity, and (e) notifying 710 an intervention mechanism 216 of the one or more incriminated entities. A variation includes (a) collecting 702 at least one incrimination candidate 310 based on at least one cybersecurity alert 132 specifying at least one entity 130, (b) submitting 704 at least one collected incrimination candidate 310 to the incrimination logics interface 304 and in response receiving 706 an incrimination boost attempt 410 result 312, (c) determining the incrimination boost attempt result 312 indicates a boost 408 in the incrimination confidence 314 past the specified threshold 316, (d) marking 708 each entity 130 specified in the at least one cybersecurity alert 132 as an incriminated 1102 entity, and (e) notifying 710 an intervention mechanism 216 of the one or more incriminated entities.

In some embodiments, a sub-organization-level incrimination logic 404 includes a graph-based incrimination logic 412. The graph-based incrimination logic 412 includes computing hardware 102 configured by software 302 to detect a cybersecurity anomaly 308 based on a digital graph representation 320 of the following: at least two machines 101 of the organization 208, at least one connection 414 between machines of the organization, and at least one machine attribute 416 or at least one connection attribute 416 or both. In a graph data structure 406, connections 414 between machines 101 are represented as edges 422 between nodes 420. Edges are sometimes called "links".

Connections 414 represented in a graph 406 are not necessarily network connections. In some embodiments, the connection edge 422 between machine nodes 420 can correspond to any of the following: a network 108 connection, a repeated file 502, a repeated action 418, similar actions 418 (e.g., same command with different parameters) by the same user account 508, or a repeated process 504.

For example, if a network 108 connection is made from one machine to another machine, then an embodiment may create a link 422 between those two machine nodes 420. The link could have a "network connection" attribute 416.

As another example, if a file 502 is found on two machines in the organization and the file's provenance is unclear (e.g., does not correspond to any entry in any log of authorized activities), then an embodiment may create a link 422 between those two machine nodes 420. The link type 416 could be "file X exists"; link type may be represented as a set of one or more attributes 416. The file could be treated as repeated if it has the same filename on both machines, for example. In a variation, the file is repeated only if it has the same filename and the same path location relative to a specified parent directory in a file system hierarchy. In further or alternate variation, a file is repeated only if it is dropped or created on two machines within a specified time tolerance, e.g., within a two hour period, or within a one hour period.

As another example, if the same user 104 did one or more actions 418 on both of two (or more) machines, the graph 406 could include an action type edge connecting the corresponding nodes. Actions may also be called "events". The edge may be directed by event time, e.g., an earlier event may be connected to a later event via a directed edge from the earlier event's node to the later event's node.

As another example, an edge may represent a process 504 that is executed (or executing) on two machines. The process may be represented digitally as a process name (or process ID) plus command line arguments. The edge may be directed by event time, e.g., an earlier started process instance may be connected to a later started process instance via a directed edge from the earlier instance's node to the later instance's node. A process invocation may be treated as a particular kind of action 418.

In some embodiments, a sub-organization-level incrimination logic 404 includes a local incrimination logic 426. The local incrimination logic 426 includes computing hardware 102 configured by software 302 to detect a cybersecurity anomaly 308 based on a digital representation 320 of data 118 or a digital representation 320 of computational activity 418, or both, on a particular machine 101 of the organization. "Computational" or "computationally" imply existence within a system 102 as opposed to being mere mental phenomena.

That is, the local incrimination logic 426 is designed and operable to detect an anomaly that is local 424 to a particular machine 101. By contrast, graph-based incrimination logic 412 detects anomalies that involve at least two of the organization's machines, and organization-level incrimination logic 402 detects anomalies that involve at least a substantial amount (per a substantiality criterion 318) of the organization's machines.

In some embodiments, the processor 110 is further configured to implement or utilize a search logic 322 to search for an additional incrimination candidate 310 based on at least one incriminated entity.

In some embodiments, the organization-level incrimination logic 402 includes computing hardware 102 configured by a machine learning software model 428, 302 trained using alert spike 306 data 430 derived from multiple ransomware organizational-level attacks 212.

In some embodiments, the organization-level incrimination logic 402 includes computing hardware 102 configured by a machine learning software model 428, 302 trained by supervised learning using alert spike 306 data 430 derived from at least one ransomware organizational-level attack 212.

In some embodiments, the sub-organization-level incrimination logic 404 includes a graph-based incrimination logic 412, which includes computing hardware 102 configured by a graph convolutional neural network 602 machine learning software model 428, 302 trained using a graph 406 having nodes 420 which represent machines 101 of the organization, edges 422 which represent connections 414 between machines of the organization, and at least one machine attribute 416 or at least one connection attribute 416 or both.

In some embodiments, the sub-organization-level incrimination logic 404 includes a graph-based incrimination logic 412, which includes computing hardware 102 configured by a graph machine learning software model 428, 302 trained by supervised learning using graphs 406 having nodes 420 which represent machines 101 of the organization, and edges 422 which represent connections 414 between machines of the organization.

One of skill informed by the teachings of the present disclosure will acknowledge that embodiments may be selected and configured to provide various technical benefits. For example, an organization-level incrimination logic combined with at least one sub-organization-level incrimination logic detects ransomware that targets an organization, not merely ransomware that targets an individual machine. Also, submitting at least one collected incrimination candidate to the incrimination logics interface and in response receiving an incrimination boost attempt result detects ransomware that would evade detection by a given individual detection mechanism.

In addition, benefits follow from employing a graph-based incrimination logic to detect a cybersecurity anomaly based on a digital graph representation of the following: at least two machines of the organization, at least one network connection between machines of the organization, and at least one machine attribute or at least one connection attribute or both. These benefits include detection of ransomware lateral movement, and detection of ransomware that would evade detection by mechanisms that watch for attacks along specific paths or operational sequences.

Furthermore, searching for an additional incrimination candidate based on at least one incriminated entity has the benefit of efficiently and effectively expanding the set of ransomware entities, e.g., to include additional ransomware-incriminated processes, files, IP addresses, devices, or user accounts.

These example scenarios are illustrative, not comprehensive. One of skill informed by the teachings herein will recognize that many other scenarios and many other variations are also taught. In particular, different embodiments or configurations may vary as to the number or grouping of incrimination logics 214, the kinds of entities 130, or the kinds of connections 414, for example, and yet still be within the scope of the teachings presented in this disclosure.

Other system embodiments are also described herein, either directly or derivable as system versions of described processes or configured media, duly informed by the extensive discussion herein of computing hardware.

Although specific organizational ransomware detection architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of alert or trigger data 132, for example, as well as different technical features, aspects, security controls, mechanisms, rules, criteria, expressions, hierarchies, operational sequences, data structures, environment or system characteristics, or other organizational ransomware detection functionality 204 teachings noted herein, and may otherwise depart from the particular illustrative examples provided.

Processes (a.k.a. Methods)

Figure 9:
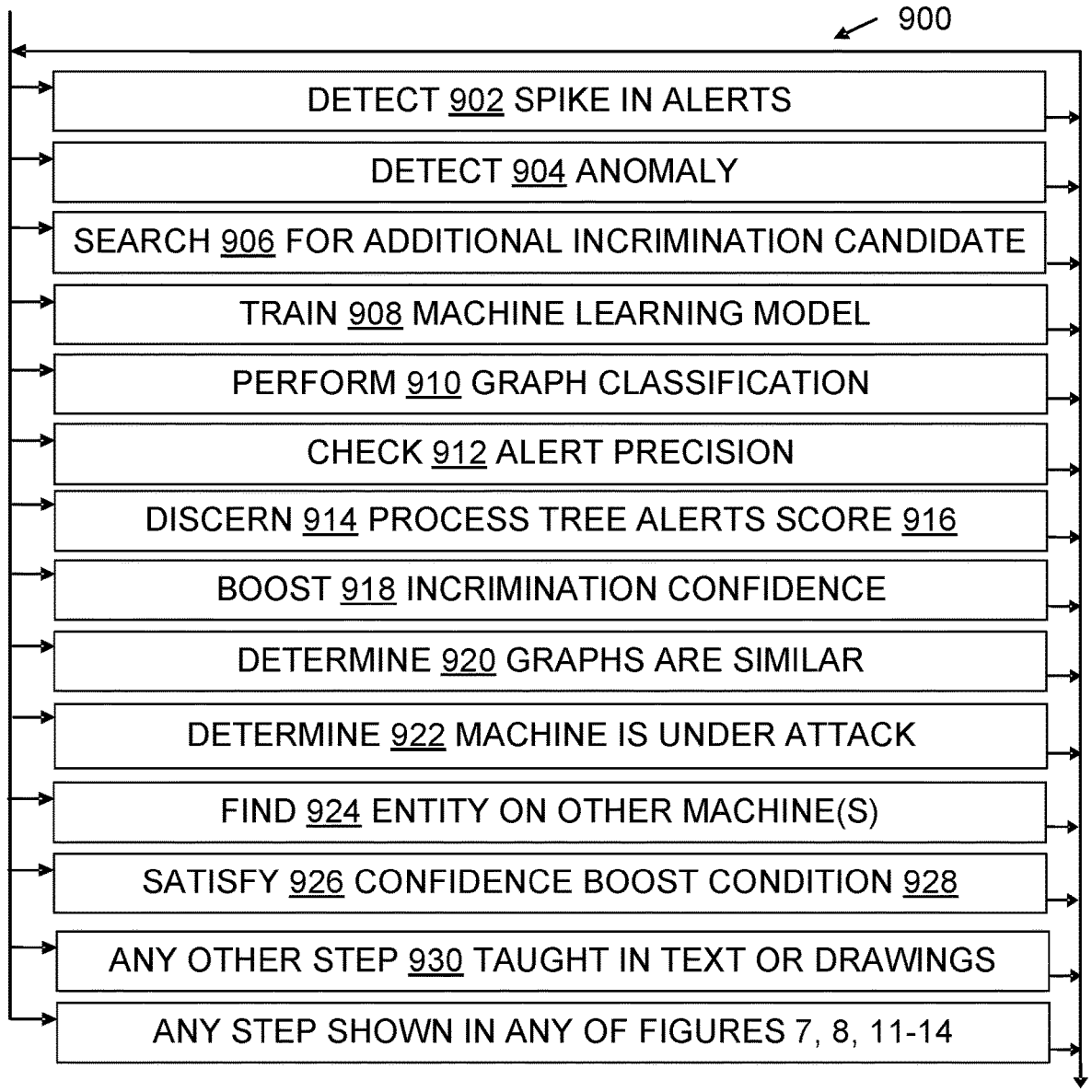
FIG. 9 is a flowchart further illustrating steps in some organizational ransomware protection methods, incorporating FIGS. 7, 8, and 11-14.

Methods (which may also be referred to as "processes" in the legal sense of that word) are illustrated in various ways herein, both in text and in drawing figures. FIGS. 7-9 and 11-14 illustrate families of methods 700, 800, 900, 1100, 1200, 1300, 1400 that may be performed or assisted by an enhanced system, such as system 202 or another functionality 204 enhanced system as taught herein. FIG. 9 includes some refinements, supplements, or contextual actions for steps shown in FIGS. 7, 8, and 1-14, and incorporates the steps of those Figures as options.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human 104 may type in a value for the system 202 to use as a substantiality criterion. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIGS. 7-9 and 11-14. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 900 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments provide or utilize a method for protecting an organization against organizational ransomware, the method performed (executed) by a computing system, the method including: collecting 702 at least one incrimination candidate 310 based on at least one cybersecurity alert 132 specifying at least one entity 130; submitting 704 at least one collected incrimination candidate to an organization-level incrimination logic 402 interface 304 and in response receiving an organization-level incrimination boost attempt result 312; submitting 704 at least one collected incrimination candidate to at least one sub-organization-level incrimination logic 404 interface 304 and in response receiving at least one sub-organization-level incrimination boost attempt result 312; when the incrimination boost attempt results 312 do not collectively indicate a boost in an incrimination confidence 314 past a specified threshold 316, then returning 712 to the collecting 702; when the incrimination boost attempt results 312 collectively indicate a boost 408 in the incrimination confidence past the specified threshold, marking 708 each entity specified in the at least one cybersecurity alert as an incriminated 1102 entity; and notifying 710 an intervention mechanism 216 of the one or more incriminated entities. A variation includes collecting 702 at least one incrimination candidate 310 based on at least one cybersecurity alert 132 specifying at least one entity 130; submitting 704 at least one collected incrimination candidate to an organization-level incrimination logic 402 interface 304 and in response receiving an organization-level incrimination boost attempt result 312; submitting 704 at least one collected incrimination candidate to at least one sub-organization-level incrimination logic 404 interface 304 and in response receiving at least one sub-organization-level incrimination boost attempt result 312; determining the incrimination boost attempt results 312 collectively indicate a boost 408 in the incrimination confidence past the specified threshold; marking 708 each entity specified in the at least one cybersecurity alert as an incriminated 1102 entity; and notifying 710 an intervention mechanism 216 of the one or more incriminated entities.

In some embodiments, the method includes: receiving 802 the at least one collected incrimination candidate 310 from the organization-level incrimination logic 402 interface 304; executing 804 an organization-level incrimination logic 402 which includes performing a statistical analysis 440 of alerts from a substantial amount 318 of machines of the organization, the substantial amount including at least fifteen percent of the machines of the organization or at least ten machines of the organization, or both; determining 806 the organization-level incrimination boost attempt result 312 based on at least whether the executing identifies an anomaly 308; and sending 808 the organization-level incrimination boost attempt result 312 to the organization-level incrimination logic interface.

In some embodiments, the method includes: receiving 802 the at least one collected incrimination candidate 310 from the organization-level incrimination logic interface 304; executing 804 an organization-level incrimination logic 402 which includes a machine learning model 428 trained using alert data 132, 430 derived from multiple ransomware organizational-level attacks; determining 806 the organization-level incrimination boost attempt result 312 based on at least an output of the machine learning model; and sending 808 the organization-level incrimination boost attempt result 312 to the organization-level incrimination logic interface.

In some embodiments, the method includes: receiving 802 the at least one collected incrimination candidate 310 from the sub-organization-level incrimination logic interface 304; executing 804 a sub-organization-level incrimination logic 404 which includes a machine learning model 428 trained using graph data 406, 430 derived from multiple ransomware organizational-level attacks 212, the graph data including a graph 406 having nodes 420 which represent machines 101 of the organization, and edges 422 which represent connections 414 between machines of the organization; determining 806 the sub-organization-level incrimination boost attempt result 312 based on at least an output of the machine learning model; and sending 808 the sub-organization-level incrimination boost attempt result 312 to the sub-organization-level incrimination logic interface.

In some embodiments, the method includes searching 906 for an additional incrimination candidate 310 based on at least one incriminated entity, and the at least one incriminated entity includes or identifies at least one of the following: a computational process 504 in a kernel 120 or an application program 122, a file 502, an IP address 506, a device 101, or a user account 508.

In some embodiments, the method includes executing 804 a sub-organization-level incrimination logic 404 which includes performing 910 at least one of the following graph classification algorithms 600: a graph neural network algorithm 602; a graph statistical anomaly detection algorithm 606; or a bag of words algorithm 604 based on graph node features 416.

In some embodiments, the method includes executing 804 a sub-organization-level incrimination logic 404 which includes performing at least one of the following local incrimination logic sequences: collecting 702 an incriminated file from the at least one cybersecurity alert 132 for a particular machine, and searching 906 other machines of the organization for a copy of the incriminated file (this may be referred to as a "pivoting remoting file detector" sequence); checking 912 a precision 438 of the at least one cybersecurity alert for a particular machine, and searching 906 the particular machine for a remoting connection 434 (this may be referred to as a "precision based logic with remoting" sequence); or discerning 914 an aggregated process tree alerts score 916 of the at least one cybersecurity alert for a particular machine, and searching 906 the particular machine for a remoting connection 434 (this may be referred to as a "combined score-based logic that includes a remoting component" sequence).

In some embodiments, the method includes boosting 918 the incrimination confidence 314 based on at least the following incrimination confidence boost condition: a graph-based sub-organization-level incrimination logic 412 determines 920 that a graph 406 representing the incrimination candidate 310 is similar to graphs of ransomware incidents 212.

In some embodiments, the method includes boosting 918 the incrimination confidence 314 based on at least the following incrimination confidence boost condition: a local sub-organization-level incrimination logic 426 determines 922 that a particular machine 101 of the organization is under ransomware attack, and an entity 130 of the incrimination candidate 310 is also found 924 on at least a specified number of other machines of the organization within a specified time period 436. The specified number of other machines may be set by an admin to satisfy a substantiality criterion, for example, and the specified time period may be set by an admin at two hours, or in some cases one hour or less.

In some embodiments, the method includes boosting 918 the incrimination confidence 314 based on at least the following incrimination confidence boost condition: at least a specified number of different sub-organization-level incrimination logics 404 and at least a specified number of different machines 101 of the organization are identified in cybersecurity alerts 132 within a specified time period 436. The specified number of other machines may be set to satisfy a substantiality criterion, for example, and the specified time period may be two hours, or in some cases one hour or less.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as incrimination logics 214, search logics 322, digital representations 320, organizational ransomware protection software 302, machine learning models 428, and graph classification algorithms 600, in the form of data 118 and instructions 116, read from a removable storage medium 114 and/or another source such as a network connection, to form a configured storage medium. The configured storage medium 112 is capable of causing a computer system 102 to perform technical process steps for facilitating protection against organizational ransomware, as disclosed herein. The Figures thus help illustrate configured storage media embodiments and process (a.k.a. method) embodiments, as well as system and process embodiments. In particular, any of the process steps illustrated in FIG. 7-9 or 11-14, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a method for protecting an organization against organizational ransomware. This method includes: submitting 704 at least one incrimination candidate to an organization-level incrimination logic interface and in response receiving 706 an organization-level incrimination boost attempt result; submitting 704 at least one incrimination candidate to at least one sub-organization-level incrimination logic interface and in response receiving 706 at least one sub-organization-level incrimination boost attempt result; ascertaining that the incrimination boost attempt results collectively indicate a boost 408 in an incrimination confidence past a specified threshold; and notifying 710 an intervention mechanism that an entity of the incrimination candidate is an incriminated entity.

In some embodiments, the method further includes performing 910 at least one of the following graph classification algorithms: a graph neural network algorithm; or a graph statistical anomaly detection algorithm.

In some embodiments, the method includes performing a local incrimination logic sequence which includes: collecting 702 an incriminated file from the at least one cybersecurity alert for a particular machine, and searching 906 other machines of the organization for a copy of the incriminated file.

In some embodiments, the method includes performing a local incrimination logic sequence which includes: checking 912 a precision of the at least one cybersecurity alert for a particular machine, and searching 906 the particular machine for a remoting connection.

In some embodiments, the method includes performing a local incrimination logic sequence which includes: discerning 914 an aggregated process tree alerts score of the at least one cybersecurity alert for a particular machine, and searching 906 the particular machine for a remoting connection.

Additional Observations

Additional support for the discussion of organizational ransomware protection functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

One of skill informed by the teachings herein will recognize the advantages of those teachings over alternative ransomware protection approaches. For example, some approaches focus on recognizing a specific characterizing sequence to detect ransomware, even down to the detailed level of port numbers utilized, names of files dropped, particular shell commands invoked, and so on. These approaches are effective when attackers follow the characterizing sequence and when the data is available to determine that the attackers have done so. Indeed, local incrimination logics may rely on recognition of a characterizing sequence for ransomware detection. But these approaches are much less effective when an attacker takes a different path into a targeted system, or when the attacker has deleted logs and other data that show the path taken. Even a single gap in path data make prevent a logic from concluding that the path data represents an attack. Accordingly, supplementing or overriding the local incrimination logics as taught herein increases the likelihood of catching an attack early.

In some embodiments, a method of detecting a ransomware attack includes: detecting a spike in cybersecurity alerts across a set of machines (organization-level incrimination logic); producing a graph of connected machines with suspicious activity (graph-based incrimination logic); correlating nominally unrelated behaviors in a machine (local incrimination logic); and calculating a ransomware incrimination score based on a combination of results of the detecting, the producing, and the correlating.

Some embodiments include or utilize an incrimination engine 1008. In some embodiments, the incrimination engine 1008 is a component an endpoint protection mechanism 1004 used to identify suspicious entities and flag them as incriminated. This is done automatically during an attack 212 and those entities are sent to feedback loop blocking 216 for containment. From that point, the entire organization is better protected, in that all the organization's machines that receive this entity will block it immediately.

Figure 10:
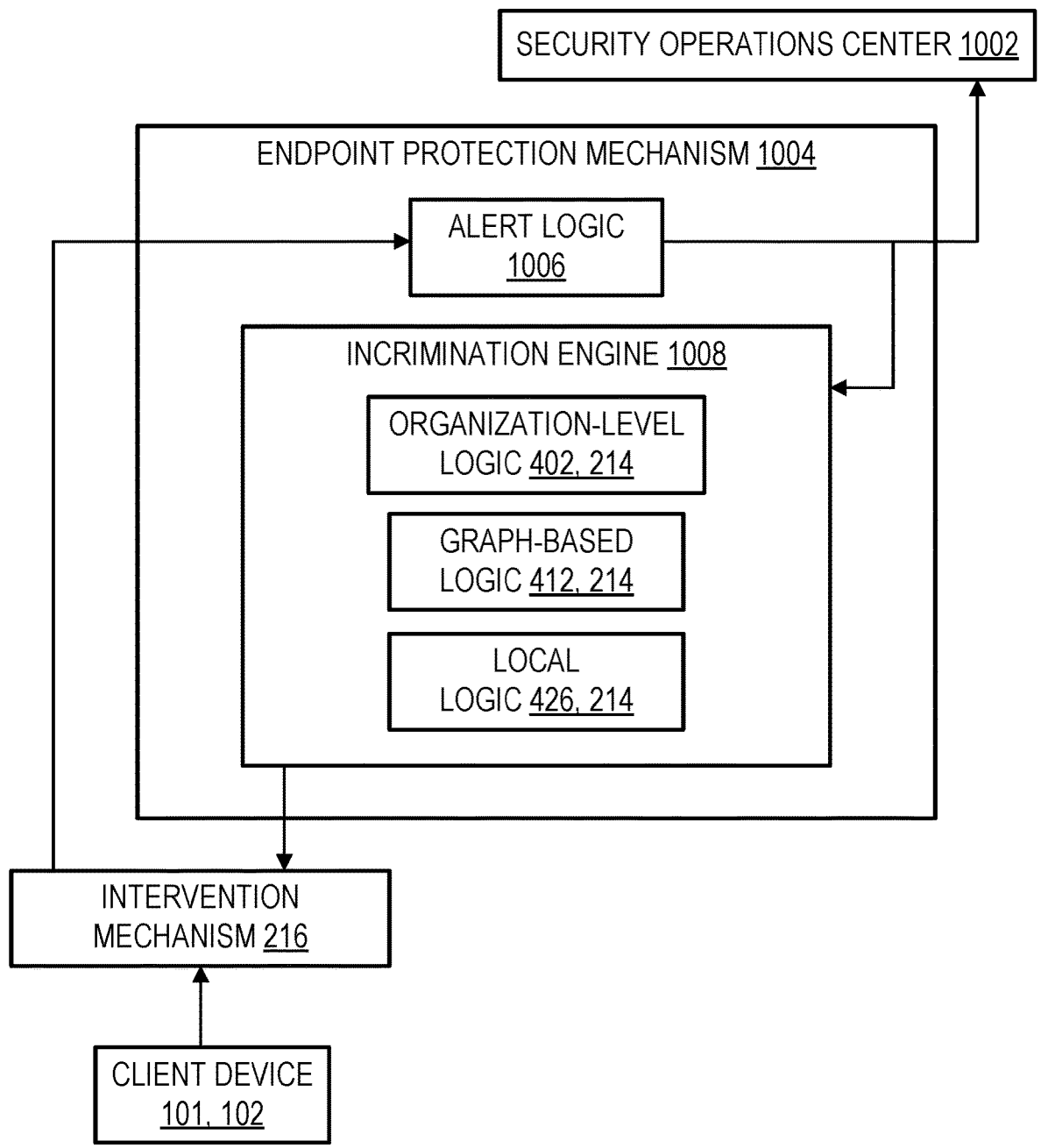
FIG. 10 is a data flow diagram illustrating an endpoint protection mechanism in relation to an intervention mechanism, a client device, and a security operations center.

One may separate the incriminating logic 214 into three categories. Organization level logic 402 examines many (perhaps even all) of the alerts in the organization using a time series and looking for anomalies via statistical analysis. Graph based logic 412 searches for locally connected machines 101 in the organization. Graph based logic may use aggregation 1400 of suspicious events to identify malicious activity across a small number of machines, e.g., less than ten machines. Finally, local boosting incrimination logic 426 identifies a single machine that has been determined with a very high confidence 314 to have suspicious activity. Local boosting incrimination logic 426 may use ML (machine learning) to incriminate the entities. FIG. 10 shows an incrimination engine operating as a component inside an endpoint detection and response mechanism 1004.

Although local incrimination alone is not well suited to protect against organization-level ransomware attacks, it can contribute to detection. Sometimes there is enough evidence to incriminate an entity based on suspicious signals on one machine. One such example is when attackers are using evasion. The evasion is achieved by spreading the activity over time and over different processes when each process doesn't have a direct link via the process chain to its peer process that is participating in the attack. As a result, the attack can remain undetected when defenses do not adequately correlate entities. If the signals themselves are not strong enough for each process chain, an alert won't be generated.

A simplified version of evasion activity uses a startup folder and ASEP (AutoStart Extension Points). The attacker, after taking over the machine, opens cmd.exe and writes a file to the startup folder. In addition, the cmd.exe process creates other processes that continue to execute malicious activities. When the machine restarts, the file in startup folder will execute additional commands and its parent id will be explorer.exe which is facially unrelated to the original cmd.exe that wrote the file. This behavior will split the malicious activity into two separate process chains at different times and defensive tools might not correlate them as part of a single attack. As a result, an alert might not be generated because each process didn't make enough noise on its own to warrant a detection. Some embodiments make those connections between different entities on the machines and use advanced aggregations to identify subtle activities that might go unnoticed otherwise. When there is enough confidence of a sophisticated attack taking place on one machine, an embodiment will incriminate the processes and files that are part of the attack and notify an intervention mechanism for blocking and remediation.

Figure 11:
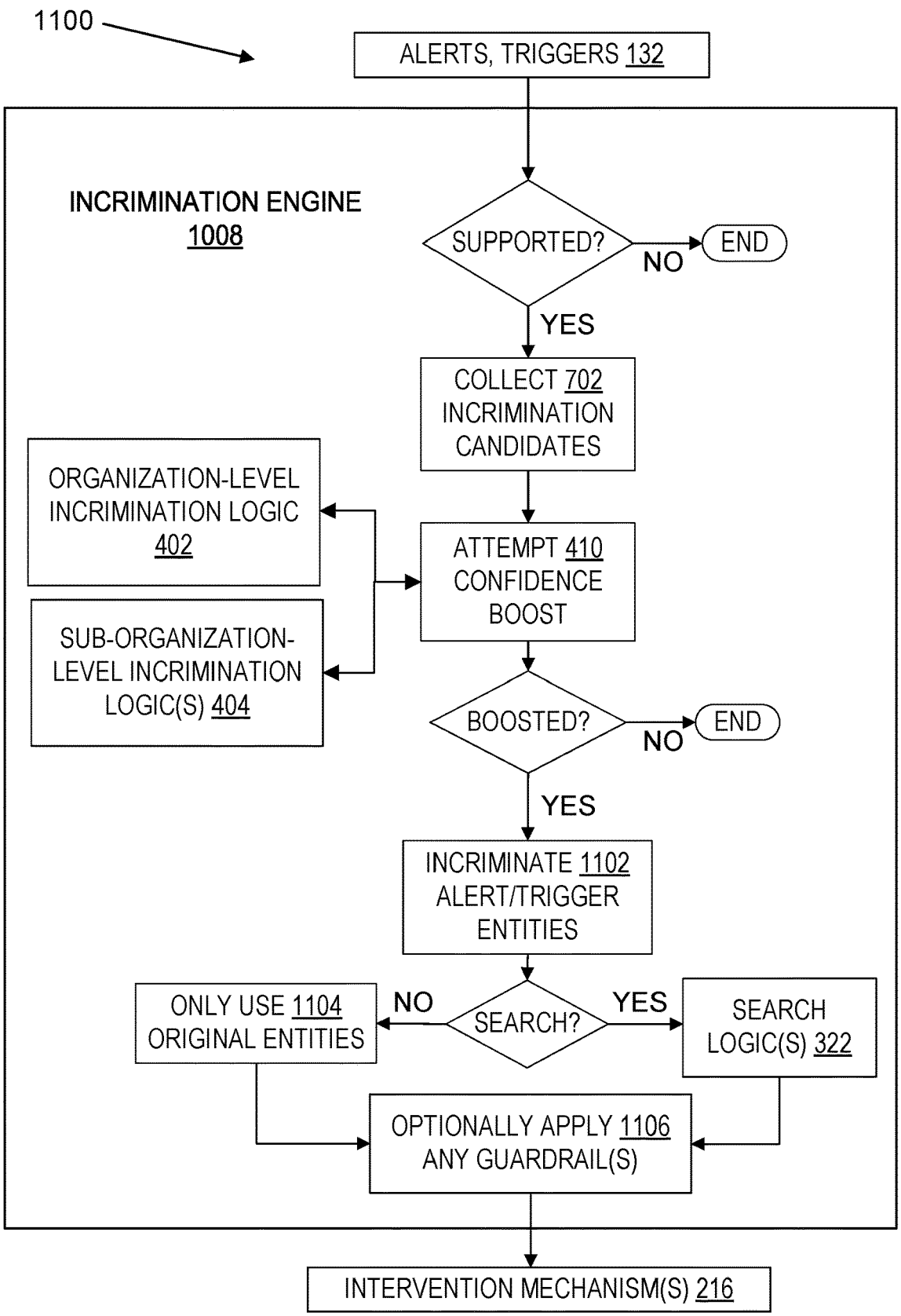
FIG. 11 is a data flow diagram with an embedded flowchart illustrating an incrimination engine in relation to an intervention mechanism and incoming cybersecurity alerts.

FIG. 11 shows a flow chart of each incrimination detection inside one embodiment of the incrimination engine 1008. A trigger or another type of alert 132 may be produced by an endpoint protection mechanism 1004, an antivirus tool 122, an intrusion detection tool 122, a SIEM 122, or another cybersecurity tool within a system 102. In some embodiments, triggers can be created by research. Triggers 132 may represent a suspicious event that happened on a machine 101 of a protected system 102.

In one operation scenario, when there is a trigger event the engine starts an incrimination flow. First, it collects 702 entities from the trigger 132 and starts the incrimination logics 214. Logics 214 may include static logics, machine learning logics, or both, for example. In this example, the logic 214 is separated into three categories: org-level per FIG. 12 for example, graph-level per FIG. 14 for example, and local boosting sections per familiar machine-localized detection tools 122, for example. If the logic 214 confirms incrimination (BOOSTED is YES), this engine 1008 example searches 906 for more entities on the machines to increase coverage. Other engine 1008 embodiments omit search 906. Different search logics 322 can be used to find more entities. Once all files, processes, and other entities are found, the engine 1008 sends 710 them to the feedback loop blocking 216 for incrimination and org level block.

As to organization level logic, when a human operated ransomware attack is taking place, during a spread phase there may be a lot of noise in the system 102. For example, an endpoint protection mechanism 1004 may be alerting on many machines, causing a spike 306 in alerts that happens across much or even all of an organization in an infected population. For instance, the number of alerts may spike from under ten to more than a hundred, or even a thousand, within three hours or less.

Figure 12:
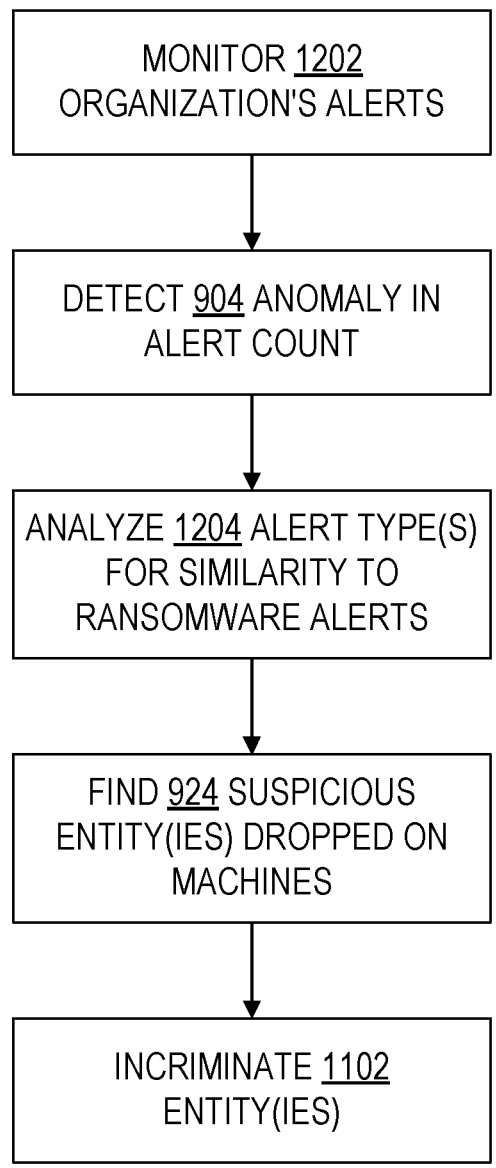
FIG. 12 is a flowchart illustrating steps in an organizational-level incrimination logic method.

FIG. 12 shows an approach to organization level detection. In this example, a system 202 identifies the organization level attack by using anomaly detection on the alert level. When the endpoint protection mechanism 1004 is generating alerts, the incrimination engine is monitoring 1202 an aggregation of those alerts for the organization using a time series. Statistical analysis 440 is applied to detect 902 a significant increase in alert volume. Once there is an increase, the system 202 analyzes the alerts in the spike. A machine learning model 428 is used to discern between true ransomware attacks and spurious spikes of alerts. If those alerts resemble a ransomware attack, the system 202 searches 906 for suspicious entities and incriminates them according to their relevance and their spread across the organization.

Figure 13:
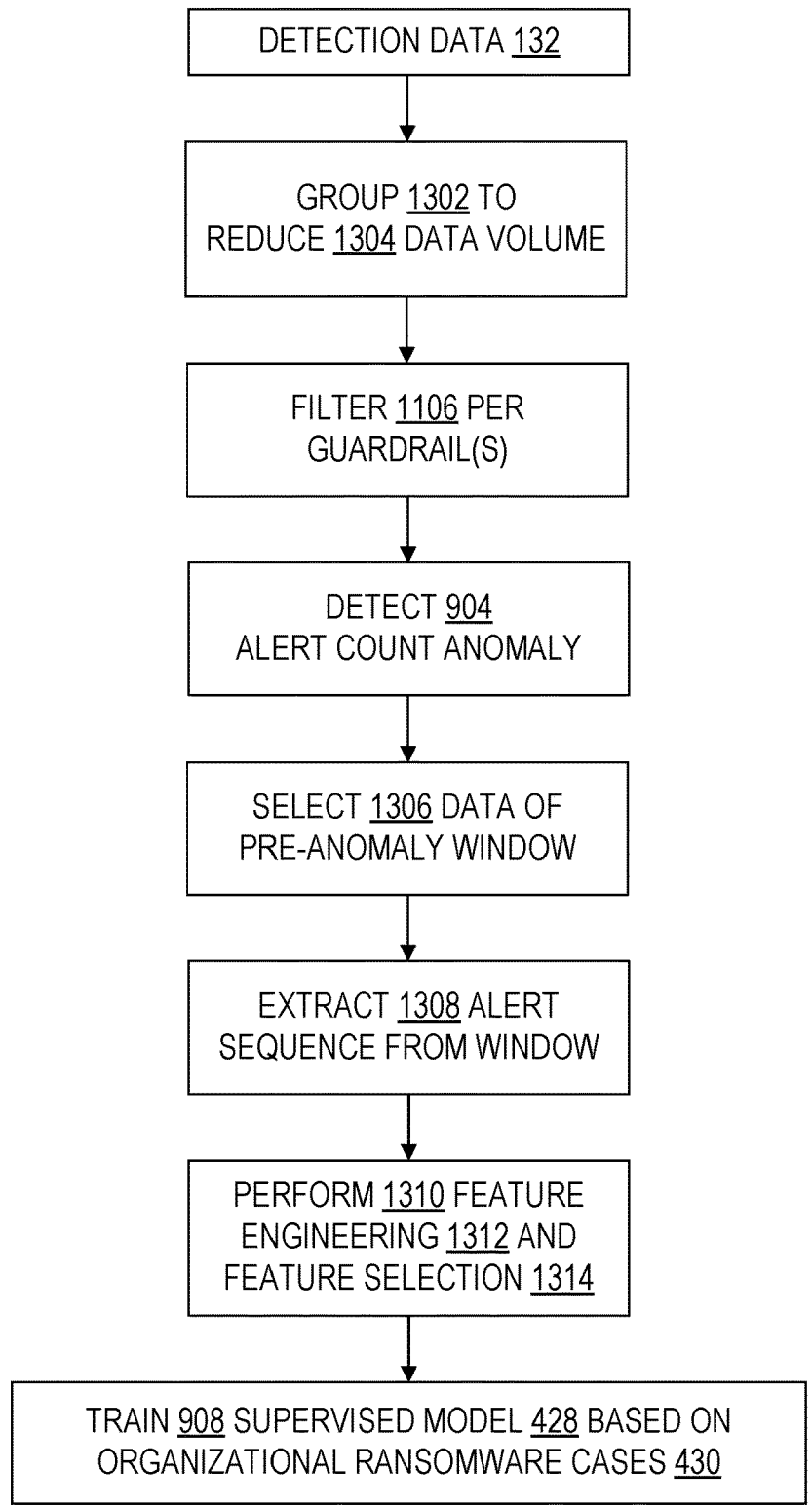
FIG. 13 is a data flow diagram illustrating an organizational-level incrimination logic data pipeline.

FIG. 13 shows a data pipeline 1300 for the org level incrimination, which combines org level anomaly detection with supervised learning. The pipeline represents a supervised learning approach to finding org level ransomware incidents using alerts. This approach looks at types of alerts and at the velocity of the alert across the organization using time series. Grouping 1302 may reduce data volume substantially, e.g., by 95% in some cases. One kind of grouping 1302 is by alert time and distinct machine count, and another is by wall clock time and distinct machine count. Guardrail filtering may require, e.g., at least five distinct machines for data to pass forward to anomaly detection 904. Anomaly detection 904 in this example uses time series on distinct machine counts per alert per hour. Selection 1306 may then filter by forwarding only data from an X hour window before the apparent anomaly, e.g., with X=1, 2, or 3. Data may be reduced by taking only rows with anomalies. Extraction 1308 may take a sequence of alerts from a window, e.g., alert1→alert2→etc. Feature engineering 1312 and feature selection 1314 may produce, e.g., a top one hundred features (entities), and data which does not contain any of the top features is filtered out.

Using this type of data pipeline reduces the data via anomaly detection. Accordingly, it becomes easier to train a supervised learning model on higher quality data, by reducing the noise found in the raw data. As an embodiment collects past incidents with ransomware infection, it can use anomaly detection in conjunction with supervised learning to get a higher quality model.

Some embodiments, combine anomaly detection with supervised learning and a rules-based approach. In some, after the anomaly detection, the embodiment may utilize heuristic detection rules by looking for highly severe ransomware alerts, may identify and leverage similarity with existing organization ransomware alert sequences, and may employ a supervised sequence classifier 428.

With regard to graph level logic 412, in some circumstances organization level monitoring is difficult and may pose challenges when the volumes of alerts are still low and not enough noise is present at the org level. Instead of anomalies of alerts, an embodiment can also focus on a graph-based approach which provides a more focused view of several connected machines but is still wide enough for high confidence detections. One of the signals used to create a connected graph is remote activity on the machine. This activity can originate from popular admin tools such as PsExec or wmi or WinRm, to name just a few examples, when another machine in the organization is connecting to the target machine with admin credentials. This can happen because of an earlier credential theft by the attacker.

There are many tools making such network connectivity available. They may produce a lot of noise. Many are used by administrators for legitimate purposes. When remote activity is happening, an embodiment may tag the process and all related processes with a remote context attribute 416. In addition, an embodiment may look for several suspicious activities that this process is executing during the connection timeframe.

In a typical attack pattern, a machine A is compromised using some initial attack vector. The attacker takes over this machine via RDP (Microsoft Remote Desktop Protocol) or some remote shell and starts to scan the network. If possible, the user will move laterally to a machine B. At this point, the remote process that originated the connection, e.g., wmic.exe via command line and wmiprvse.exe on the target, can spawn a new process that will perform remote activities. An embodiment may paint representations 320 of this process and its ancestors with a remote context attribute 416. At machine B, in this example scenario, the attack scans the network and finds a domain administrator machine C, which the malware connects to using a local admin credential. On machine C, the malware performs privilege escalation, and then spreads to more machines—even the entire network—using the elevated position of privilege.

In some embodiments, graph-based detection logic 412 is generating the machine entities in memory and producing a virtual graph 406 of connected components 420 where each one 420 represents a machine 101 with suspicious activities. Those activities might be low fidelity signals such as scores of certain ML models or other suspicious signals on the machine. The edges 422 of the graph represent, e.g., network connections 434 that represent suspicious connectivity. This graph is then analyzed by a model 428 and a final risk score 1402 is produced.

Figure 14:
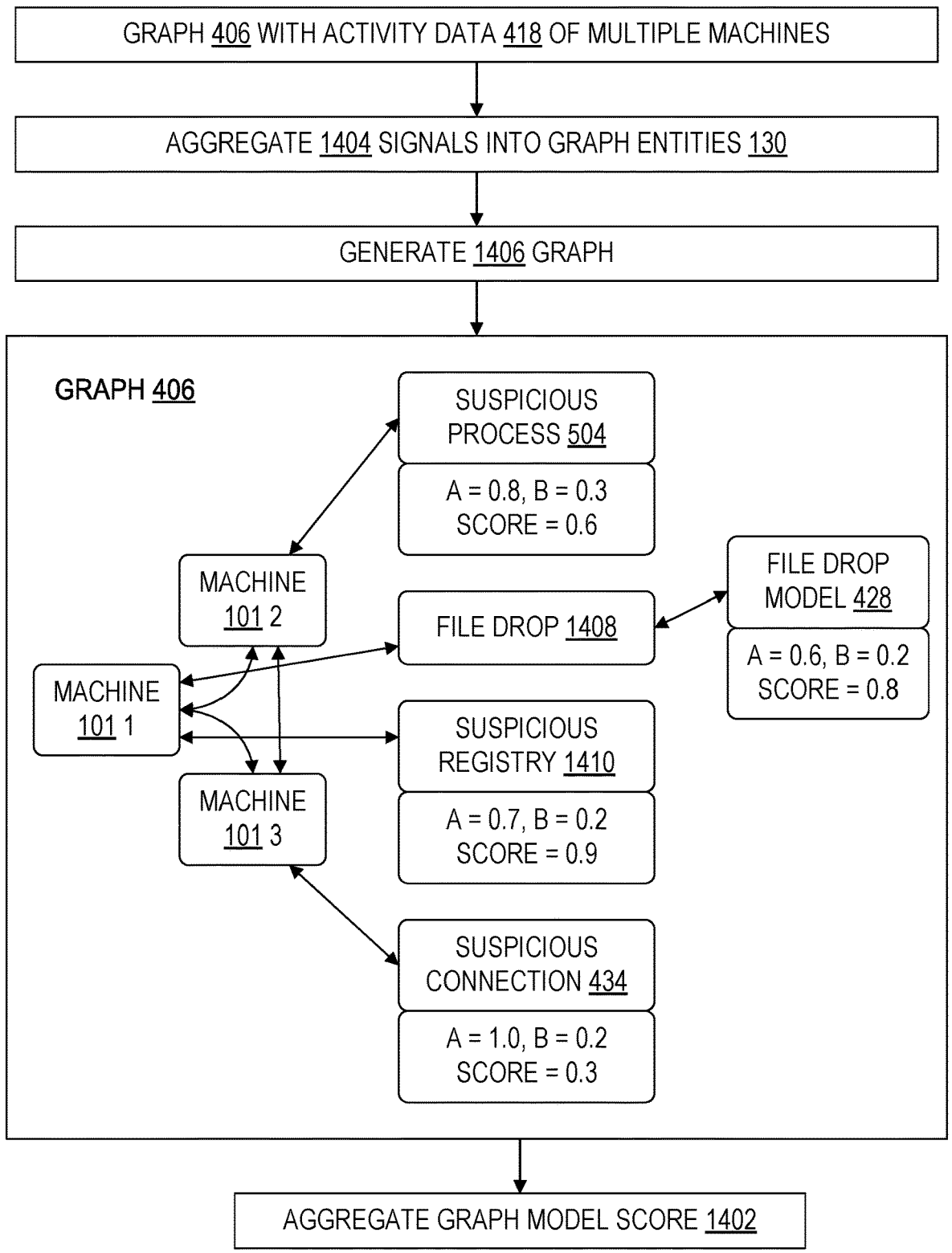
FIG. 14 is a data flow diagram with an embedded graph, illustrating steps in a method of aggregating graph entities to produce a graph model score.

FIG. 14 shows one example of graph aggregation activities and generation of the risk score. Data used to generate 1406 the graph 406 might include, for example, activity data 418 along the following lines:

Machine 1:
    Time: T1, Activity: suspicious registry
    Time: T2, Activity: file delete
    Time: T3, Activity: suspicious connection
    Time: T4, Activity: drop file
Machine 2:
    Time: T5, Activity: suspicious process
    Time: T6, Activity: access credentials
    Time: T7, Activity: scan network
    Time: T8, Activity: scheduled task
Machine 3:
    Time: T9, Activity: exploratory commands
    Time: T10, Activity: suspicious connection
    Time: T11, Activity: create process
    Time: T12, Activity: drop file The graph risk score might be calculated, e.g., using a formula of the form: graph score=$\Sigma$ ax+b. In the specific FIG. 14 example, this calculation would be graph score=$\Sigma$ ax+b=(0.7*0.9+0.2)+(0.8*0.6+0.3)+(0.6*0.8+0.2)+(1*0.3+0.2)=0.83+0.51+0.68+0.5=2.52.

Once the features at graph level are extracted, an embodiment can use a supervised graph algorithm 600 to classify between malicious and benign connectivity graphs. Some suitable graph algorithm 600 examples include graph neural networks 602, statistical anomaly detection algorithms 606, and simple bag of words approaches 604 on the features of each node in the graph.

Another logic category in the incrimination engine is the local incrimination logic 426 based on a single machine. Sometimes there is enough evidence to incriminate based on suspicious signals on one machine. The following are some examples of the local incrimination logics.

A pivoting remoting file detector logic 426 collects incriminated files from the original alert entities and searches for copies of them in all organization machines via a search engine. This logic will search for the file in all machines in the org and return machine info on each found file. This logic assumes that if an incriminated file from original alert passed basic ransomware guardrails and is available on more than X machine in the org, the engine 1008 will perform incrimination and send to an intervention mechanism 216.

A precision-based logic with remoting assumes that the trigger to the incrimination engine is an ML alert. It checks the precision of the original alert and checks for suspicious remote connections on the machine in the last x hours. If the precision is very high (0.98 and above out of a possible 1.00) and there was a remoting observation on that machine, the engine 1008 will incriminate.

A combined score-based logic includes a remoting component. This logic assumes that an ML alert was triggered. It looks at the combined score of the triggering ML alert. The combined score is the score that aggregates all ML alerts in the process tree of the triggering process. This logic assumes that a higher combined score means higher chances of true positive detection. An embodiment may combine this approach with a remote component in the last X hours on the target machine. If both remoting component and high combined score was seen on the target machine, incrimination is performed.

Some embodiments combine logic across these categories. The combination of these approaches into a single detection engine increases the probability of successful early incrimination when the payload is not yet widely deployed and the ransomware attack is still in a lateral movement phase with little or no encryption in place.

In some embodiments, all categories included in the incrimination engine are running in parallel concurrently in the cloud. Each logic can separately identify if there is an incrimination that happened. Incrimination of a file does not necessarily mean that there is a high severity ransomware attack at organization level. To check if the organization is under a ransomware attack, some embodiments include software 302 that operates, at least in part, according to the following pseudocode:

trigger—a triggering alert that starts higher level abstraction logic, e.g., 402
    orgAlert—all the alerts in the org last Y months.
    T1, T2, T3, T4, T5, T6—algorithm thresholds
ReportOrganizationLevelIncident (trigger, orgAlerts)

```
 1.  A = all alerts in orgAlerts in window of X days
 2.  If incrimination engine alerts not in [A]
 3.    Exit
 4.  If trigger == TypeOfAlert("org level incrimination alert")
 5.    Report org level ransomware incident
 6.  End
 7.  If trigger == TypeOfAlert("graph level alert ")
 8.    x = number of nodes in graph
 9.    y = number of edges in graph
10.    if x > T1 and y > T2
11.       classify graph using supervised ML model Score=
          ML(G(edges, nodes))
12.       if Score > T3
13.          Report org level ransomware incident
14.    End
15.  If trigger == TypeOfAlert("local boost alert")
16.       G = Standard Deviation from Mean in anomaly score in [A]
17.       if G > T4 // indicates a small anomaly in org level alerts
          (e.g., a small spike)
18.          search for suspicious files in alert entities
19.          if found suspicious files
20.             Check if files or processes found in other machines
                in organization
21.             if found more than Z machines (indication of spread)
22.                Report org level ransomware incident
23.          End
24.  // This logic runs if there is either graph based or local boost but
     not enough confidence in steps 15 or 7
25.  If trigger == TypeOfAlert("local boost alert") or if trigger ==
     TypeOfAlert("graph level alert ")
26.     C = Incrimination Engine alerts from [A]
27.     if Count(C) > T5 or distinct(C) > T6
28.        Report org level ransomware incident
29.     End
```

This pseudocode algorithm combines org level, graph level, and local boost categories into a single incident detection architecture. In some embodiments, this algorithm is triggered when an alert happens in an endpoint protection mechanism. If this alert is an incrimination engine alert the algorithm will start to execute. It will first check if the alert is org level. If yes, this is treated as an org level ransomware incident. If it is a graph level alert, this example checks for nodes and edges and looks at the size of the graph and the graph internals via an ML model. If the graph resembles graphs seen in ransomware incidents, an org level incident is reported 710.

If neither graph nor org level alerted but only local incrimination, some embodiments look for entities that were found and check for them in other machines in the org. If the entity is starting to spread (found more than x machines in last y minutes), an org level incident is reported 710.

Finally, if no other steps alerted but there were some alerts from incrimination engine (not high enough confidence for org level incident) some embodiments combine them into a single bucket and check if there is a high variety (many different logics alerted) and high number of machines (alerted on more that X machines). If yes, an org level incident is reported 710.

Technical Character

The technical character of embodiments described herein will be apparent to one of ordinary skill in the art, and will also be apparent in several ways to a wide range of attentive readers. Some embodiments address technical activities such as detecting 902 alert spikes 306, detecting 904 other anomalies 308, executing 804 incrimination logic 214, generating 1406 graph data structures 406, and performing graph classification algorithms 600, which are each an activity deeply rooted in computing technology. Some of the technical mechanisms discussed include, e.g., incrimination logics 214, intervention mechanisms 216, organization ransomware protection software 302, search logics 322, and machine learning models 428. Some of the technical effects discussed include, e.g., detection 700 of organization-level ransomware 210 attacks 212, and incrimination 1102 of particular digital entities 130 involved in such an attack 212. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to detect organization-level ransomware 210 attacks 212. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.
ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
OS: operating system
PaaS or PAAS: platform-as-a-service
RAM: random access memory
ROM: read only memory
SIEM: security information and even management, or tool for the same
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smart-watches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Organization-level ransomware protection operations such as collecting 702 incrimination candidates 310, communicating 704, 706 with incrimination logics 214, and many other operations discussed herein, are understood to be inherently digital. A human mind cannot interface directly with a CPU or other processor, or with RAM or other digital storage, to read and write the necessary data to perform the organization-level ransomware protection steps 900 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as aggregating, analyzing, boosting, collecting, checking, detecting, executing, extracting, filtering, finding, generating, grouping, incriminating, marking, monitoring, notifying, performing, receiving, scoring, searching, selecting, sending, submitting, training (and aggregates, aggregated, analyzes, analyzed, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment; includes one or more systems 102
- 101 machine in a system 102, e.g., any device having at least a processor 110 and a memory 112 and also having a distinct identifier such as an IP address or a MAC (media access control) address; may be a physical machine or be a virtual machine implemented on physical hardware
- 102 computer system, also referred to as a "computational system" or "computing system", and when in a network may be referred to as a "node"
- 104 users, e.g., user of an enhanced system 202; refers to a human or a human's online identity unless otherwise stated
- 106 peripheral device
- 108 network generally, including, e.g., LANs, WANs, software-defined networks, clouds, and other wired or wireless networks
- 110 processor; includes hardware
- 112 computer-readable storage medium, e.g., RAM, hard disks
- 114 removable configured computer-readable storage medium
- 116 instructions executable with processor; may be on removable storage media or in other memory (volatile or nonvolatile or both)

118 digital data in a system 102
120 kernel(s), e.g., operating system(s), BIOS, UEFI, device drivers
122 tools, e.g., version control systems, cybersecurity tools, software development tools, office productivity tools, social media tools, diagnostics, browsers, games, email and other communication tools, commands, and so on
124 user interface; hardware and software
126 display screens, also referred to as "displays"
128 computing hardware not otherwise associated with a reference number 106, 108, 110, 112, 114
130 entity in an alert; digital
132 trigger or other alert; digital
134 cloud, cloud computing environment
202 system 102 enhanced with organizational-level ransomware protection functionality 204
204 functionality for protecting against organizational-level ransomware as taught herein; may also referred to as organizational-level ransomware protection functionality 204; e.g., software or specialized hardware which performs or is configured to perform steps 702-710, software or specialized hardware which performs or is configured to perform step 804 using at least logics 402 or 412, or any software or hardware which performs or is configured to perform a method 900 or a computational organizational-level ransomware protection activity first disclosed herein
206 computationally protect, e.g., reduce or otherwise reduce cybersecurity risk related to ransomware; absolute or complete or comprehensive or perpetual avoidance of such risk is not required as part of protection 206
208 organization, as implicated or represented or impacted by its machines 101, e.g., machines 101 which the organization legitimately owns, possesses, or controls; an individual natural person is not an organization, but a legal person is an organization; some examples of organizations include hospitals, schools, businesses, public service agencies, and organizational sub-units of a larger organization, e.g., a department, task force, campus, etc.
210 ransomware; digital
212 ransomware incident or other attack, as evident or occurring in one or more machines 101 of an organization
214 incrimination logic generally; may be embodied as software, or as software and hardware, or as special-purpose hardware
216 intervention mechanism, e.g., intrusion protection system, firewall, kernel security module, SIEM, authentication or authorization mechanism, or any mechanism which is capable of security operations such as blocking, increased logging, increased authentication requirements, malware file deletion, admin notifying, etc.; also refers to security-enhancement computational activity by such a mechanism, e.g., blocking, etc.
302 organizational-level ransomware protection software, e.g., software which provides functionality 204 upon execution with at least one processor 110; "organizational-level" and "organization-level" are used interchangeably herein
304 interface generally; also refers in context to particular interfaces such as an organization-level incrimination logic interface
306 spike in alerts, e.g., an increase of at least 100% within one hour, or an increase of more than one standard deviation within two hours, or an increase past an admin-defined threshold; computational phenomenon
308 anomaly, e.g., as detected by a trained model 428 or by statistical analysis 440; computational phenomenon
310 incrimination candidate, e.g., a set of one or more entities 130 which may indicate an attack 212; digital
312 incrimination result, e.g., output from one or more incrimination logics 214 or from an incrimination engine 1008; digital
314 incrimination confidence level or other quantification indicating strength of conclusion or likelihood that an incrimination candidate is an indication of an attack 212
316 incrimination confidence threshold; digital; may be default or admin-set
318 substantiality criterion specifying what amount of an organization's machines is sufficient to qualify as a substantial amount; computational
320 digital representations, e.g., data structures
322 entity search logic generally; may be embodied as software, or as software and hardware, or as special-purpose hardware
402 organization-level logic; may be embodied as software, or as software and hardware, or as special-purpose hardware
404 sub-organization-level logic, e.g., graph-based logic 412 or local logic 426 or both; may be embodied as software, or as software and hardware, or as special-purpose hardware
406 graph data structure; digital
408 boost, increase in incrimination confidence level; digital
410 attempt to obtain or increase an incrimination confidence level; computational
412 graph-based incrimination logic; may be embodied as software, or as software and hardware, or as special-purpose hardware
414 connection, e.g., relationship or similarity or network connectivity, between machines 101, as represented digitally
416 attribute, as represented digitally; may also be referred to as a property or characteristic
418 computational activity
420 node in a graph 406; digital
422 edge in a graph 406; digital
424 state of being local to a machine 101
426 local incrimination logic; may be embodied as software, or as software and hardware, or as special-purpose hardware
428 trained machine learning model; computational artifact
430 data used for, or suitable for, training a model 428; digital
432 process tree, as represented digitally; e.g., a digital representation of which processes 504 called or spawned which other processes 504
434 remoting network connection, as represented digitally
436 time or time period, as represented digitally
438 alert precision, e.g., confidence associated with an alert 132; digital
440 statistical analysis mechanism or computational result, as represented digitally
502 file, blob, table, or other data storage unit; computational artifact 504 process in the computational sense; exists within a system 102
506 IP address or media access control (MAC) address; digital
508 user account within a system 102; computational artifact
600 graph classification algorithm, as represented computationally in a system 102
602 graph neural network; an example of algorithms 600
604 graph bag of words algorithm 600
606 graph statistical anomaly detection algorithm 600
700 flowchart; 700 also refers to organizational ransomware protection methods that are illustrated by or consistent with the FIG. 7 flowchart
702 computationally collect incrimination candidate(s)
704 computationally submit incrimination candidate(s) to incrimination logic(s)
706 computationally receive results 312 from incrimination logic(s)
708 computationally mark entity(ies) as incriminated, e.g., by setting a bit or another digital value in one or more data structures representing the entity(ies), or by adding the entity(ies) to a list or other set of incriminated entity(ies)
710 computationally notify an intervention mechanism of incriminated entity(ies), e.g., via an interface
712 during method execution, return to step 702 or step 704; step 712 may also include comparing a result 312 to a threshold 316
714 during method execution, continue to step 708; step 714 may also include comparing a result 312 to a threshold 316
800 flowchart; 800 also refers to organizational ransomware protection entity incrimination methods that are illustrated by or consistent with the FIG. 8 flowchart
802 computationally receive incrimination candidate(s) at or for incrimination logic(s)
804 computationally execute incrimination logic(s)
806 computationally determine result(s) 312 of incrimination logic(s) execution
808 computationally send result(s) 312 of incrimination logic(s) execution, e.g., via interface
900 flowchart; 900 also refers to organizational ransomware protection methods illustrated by or consistent with the FIG. 9 flowchart (which incorporates the steps of FIGS. 7, 8, 11, 12, 13, and 14)
902 computationally detect a spike in alerts, e.g., by using statistical analysis 440 or a trained model 428; a spike 306 may also be an anomaly 308
904 computationally detect an anomaly 308, e.g., by using statistical analysis 440 or a trained model 428
906 computationally search for additional incrimination candidate(s), e.g., by executing search logic 322
908 computationally train a model 428, e.g., by supervised learning
910 computationally perform graph classification, e.g., by executing an algorithm 600
912 computationally check an alert precision 438
914 computationally discern a process trees alert score, e.g., by aggregation 1400 using scores of processes 504 in a process tree 432
916 process trees alert score; e.g., an example of a score 1402 based on process relationships
918 computationally boost an incrimination confidence, e.g., based a result of executing 804 an incrimination logic
920 computationally determine graphs 406 are similar, e.g., based on edit distance, graph isomorphism, feature extraction, or an iterative matching
922 computationally determine a machine is under attack, e.g., by executing 808 a local incrimination logic 426
924 computationally find an entity, e.g., an additional instance of an entity 130, e.g., using file system search or other search logic 322
926 computationally satisfy a boost condition 928
928 boost condition, specified computationally, as one or more conditions for boosting 918 an incrimination confidence
930 any step discussed in the present disclosure that has not been assigned some other reference numeral
1002 security operations center, as represented digitally or computationally in a computing system 102 or in communication with a computing system 102
1004 endpoint protection mechanism; computational; may also be referred to as an endpoint detection and response tool or an endpoint security tool
1006 alert logic, e.g., a SIEM or other security tool that generates alerts
1008 incrimination engine, e.g., software 302 in combination with logics 214
1100 flowchart; 1100 also refers to organizational ransomware protection methods illustrated by or consistent with the FIG. 11 flowchart
1102 computationally incriminate one or more entities, e.g., by marking 708 them based on incrimination logic results or based on search logic results or both
1104 computationally limit incrimination 1102 by not searching 906 before notifying 710
1106 computationally apply filters, exclusion conditions, or other guardrails to reduce or avoid incrimination 1102
1200 flowchart; 1200 also refers to organizational ransomware protection methods illustrated by or consistent with the FIG. 12 flowchart
1202 computationally monitor alerts, e.g., via monitoring functionality adapted from a SIEM
1204 computationally analyze alert types for similarity to ransomware alert types, e.g., using a trained model 428 or by statistical analysis 440
1300 pipeline flowchart; 1300 also refers to organizational ransomware protection pipeline methods illustrated by or consistent with FIG. 13
1302 computationally group data
1304 computationally reduce an amount of data which would otherwise move forward in the pipeline
1306 computationally select data from a pre-anomaly occurrence period
1308 computationally extract alert sequence data
1310 computationally perform machine learning feature engineering
1312 machine learning feature engineering, as represented in a system 102
1314 computationally perform machine learning feature selection
1400 graph entity aggregation flowchart; 1400 also refers to graph entity aggregation methods illustrated by or consistent with FIG. 14
1402 graph risk score based at least in part on graph's entities; digital
1404 computationally aggregate signals into graph entities, e.g., by parsing alerts and extracting entity values
1406 computationally generate a graph 406

1408 computationally drop file, e.g., file copy or move; may also refer to a result thereof in a system 102

1410 computationally enter or modify a registry entry; may also refer to a result thereof in a system 102

CONCLUSION

In short, the teachings herein provide a variety of organizational ransomware protection functionalities 204 which operate in enhanced systems 202. Some embodiments help protect 206 an organization 208 against ransomware 210 attacks 212 by combining 900 incrimination logics 214. An organizational-level incrimination logic 402 helps detect 902 alert 132 spikes 306 across many 318 machines 101, which collectively indicate an attack 212. Graph-based incrimination logics 412 help detect 904 infestations 212 of even a few machines 101, and local incrimination logics 426 focus on protecting respective individual machines 101. Graph-based incrimination logics 412 may compare 920 monitored system 102 graphs 406 to known ransomware attack 212 graphs 406. Graphs 406 may have devices 101 as nodes 420 and device network connectivity 434, repeated files 502, repeated processes 504, repeated or similar actions 418, or other connections 414 as edges 422. Statistical analyses 440 and machine learning models 428 may be employed 804 as incrimination logics 214. Search logics 322 may find 924 additional incrimination candidates 310 that would otherwise evade detection, based on files 502, processes 504, IP addresses 506, devices 101, accounts 508, or other computational entities 130 previously incriminated 1102. Incrimination engine 1008 results 312 are forwarded 710 to endpoint protection systems 1004, intrusion protection systems 122, authentication controls 122, or other intervention mechanisms 216 to enhance monitored system 102 security.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system which is configured to help protect an organization against a ransomware attack by an organizational ransomware that targets multiple machines of the organization, the computing system comprising:

a digital memory;

an organization-level incrimination logic configured to detect a spike in cybersecurity alerts which occur collectively on at least a specified number of machines of the organization or on at least a specified percentage of machines of the organization, or both;

at least one sub-organization-level incrimination logic configured to detect a cybersecurity anomaly on at least one machine of the organization without regard to the organization-level incrimination logic specified number of machines of the organization and without regard to the organization-level incrimination logic specified percentage of machines of the organization;

an incrimination logics interface in operable digital communication with the incrimination logics;

a processor in operable communication with the digital memory, the processor configured to execute organizational protection against the organizational ransomware, the execution of organizational protection comprising execution of a two-level approach which combines consideration of alerts from a group of machines by using the organization-level incrimination logic with consideration of alerts from fewer machines or from only a single machine by using the at least one sub-organization-level incrimination logic, in order to detect organizational ransomware, the organizational ransomware being a particular kind of malware which is designed to spread among multiple machines without detection and then present a ransom demand, the organizational protection including: collecting at least one incrimination candidate, the incrimination candidate comprising a set of one or more attack indication computational entities, the collecting based on at least one cybersecurity alert specifying at least one computational entity of at least one machine of the organization, the at least one incrimination candidate including the at least one computational entity, submitting the at least one collected incrimination candidate to the incrimination logics interface and in response receiving an incrimination boost attempt result, determining that the incrimination boost attempt result indicates a boost in an incrimination confidence past a specified threshold, marking each computational entity specified in the at least one cybersecurity alert as an incriminated computational entity, the marking being in response to the boost attempt result indicating that the incrimination confidence passed the specified threshold, and notifying an intervention mechanism of the incriminated computational entity.

2. The computing system of claim 1, wherein the at least one sub-organization-level incrimination logic comprises a graph-based incrimination logic, the graph-based incrimination logic comprising computing hardware configured by software to detect a cybersecurity anomaly based on a digital graph representation of the following: at least two machines of the organization, at least one connection between machines of the organization, and at least one machine attribute or at least one connection attribute or both.

3. The computing system of claim 2, wherein the at least one sub-organization-level incrimination logic further comprises a local incrimination logic, the local incrimination logic comprising computing hardware configured by software to detect a cybersecurity anomaly based on a digital representation of data or computational activity or both on a particular machine of the organization.

4. The computing system of claim 1, wherein the processor is further configured to search for an additional incrimination candidate based on at least one incriminated computational entity.

5. The computing system of claim 1, further characterized in at least one of the following ways:
the organization-level incrimination logic comprises computing hardware configured by a machine learning software model trained using alert spike data derived from multiple ransomware organizational-level attacks;
the organization-level incrimination logic comprises computing hardware configured by a machine learning software model trained by supervised learning using alert spike data derived from at least one ransomware organizational-level attack;
the sub-organization-level incrimination logic comprises a graph-based incrimination logic, which comprises computing hardware configured by a graph convolutional neural network machine learning software model trained using a graph having nodes which represent machines of the organization, edges which represent connections between machines of the organization, and at least one machine attribute or at least one connection attribute or both; or
the sub-organization-level incrimination logic comprises a graph-based incrimination logic, which comprises computing hardware configured by a graph machine learning software model trained by supervised learning using graphs having nodes which represent machines of the organization, and edges which represent connections between machines of the organization.

6. A method for protecting an organization against a ransomware attack by an organizational ransomware, the organizational ransomware being a particular kind of malware which is designed to spread among multiple machines without detection and then present a ransom demand, the method executed by a computing system, the method comprising:
collecting at least one incrimination candidate based on at least one cybersecurity alert specifying at least one computational entity, the incrimination candidate comprising a set of one or more attack indication computational entities;
submitting at least one collected incrimination candidate to an organization-level incrimination logic via an organization-level incrimination logic interface and in response receiving an organization-level incrimination boost attempt result, the organization-level incrimination logic configured to detect a spike in cybersecurity alerts which occur collectively on at least a specified number of machines of the organization or on at least a specified percentage of machines of the organization, or both;
submitting at least one collected incrimination candidate to at least one sub-organization-level incrimination logic via at least one sub-organization-level incrimination interface and in response receiving at least one sub-organization-level incrimination boost attempt result, the sub-organization-level incrimination logic configured to detect a cybersecurity anomaly on at least one machine of the organization without regard to the organization-level incrimination logic specified number of machines of the organization and without regard to the organization-level incrimination logic specified percentage of machines of the organization;
determining the incrimination boost attempt results collectively indicate a boost in an incrimination confidence past the specified threshold, and marking each computational entity specified in the at least one cybersecurity alert as an incriminated computational entity which is compromised by the organizational ransomware, the marking being in response to the boost attempt results collectively indicating that the incrimination confidence passed the specified threshold; and
notifying an intervention mechanism of the at least one incriminated computational entity;
wherein the method comprises execution of a two-level approach which combines consideration of alerts from a group of machines by using the organization-level incrimination logic with consideration of alerts from fewer machines or from only a single machine by using the at least one sub-organization-level incrimination logic, in order to detect organizational ransomware.

7. The method of claim 6, further comprising:
receiving the at least one collected incrimination candidate from the organization-level incrimination logic interface;
executing an organization-level incrimination logic which includes performing a statistical analysis of alerts from a substantial amount of machines of the organization, the substantial amount including at least fifteen percent of the machines of the organization or at least ten machines of the organization, or both;
determining the organization-level incrimination boost attempt result based on at least whether the executing identifies an anomaly; and
sending the organization-level incrimination boost attempt result to the organization-level incrimination logic interface.

8. The method of claim 6, further comprising:
receiving the at least one collected incrimination candidate from the organization-level incrimination logic interface;
executing an organization-level incrimination logic which includes a machine learning model trained using alert data derived from multiple ransomware organizational-level attacks;
determining the organization-level incrimination boost attempt result based on at least an output of the machine learning model; and
sending the organization-level incrimination boost attempt result to the organization-level incrimination logic interface.

9. The method of claim 6, further comprising:
receiving the at least one collected incrimination candidate from the sub-organization-level incrimination logic interface;
executing a sub-organization-level incrimination logic which includes a machine learning model trained using graph data derived from multiple ransomware organizational-level attacks, the graph data including a graph having nodes which represent machines of the organization, and edges which represent connections between machines of the organization;
determining the sub-organization-level incrimination boost attempt result based on at least an output of the machine learning model; and
sending the sub-organization-level incrimination boost attempt result to the sub-organization-level incrimination logic interface.

10. The method of claim 6, further comprising searching for an additional incrimination candidate based on at least one incriminated computational entity, and wherein the at least one incriminated computational entity includes or identifies at least one of the following: a computational process in a kernel or an application program, a file, an IP address, a device, or a user account.

11. The method of claim 6, further comprising executing a sub-organization-level incrimination logic which includes performing at least one of the following graph classification algorithms:
- a graph neural network algorithm;
- a graph statistical anomaly detection algorithm; or
- a bag of words algorithm based on graph node features.

12. The method of claim 6, further comprising executing a sub-organization-level incrimination logic which includes performing at least one of the following local incrimination logic sequences:
- collecting an incriminated file from the at least one cybersecurity alert for a particular machine, and searching other machines of the organization for a copy of the incriminated file;
- checking a precision of the at least one cybersecurity alert for a particular machine, and searching the particular machine for a remoting connection; or
- discerning an aggregated process tree alerts score of the at least one cybersecurity alert for a particular machine, and searching the particular machine for a remoting connection.

13. The method of claim 6, wherein the method comprises boosting the incrimination confidence based on at least the following incrimination confidence boost condition: a graph-based sub-organization-level incrimination logic determines that a graph representing the incrimination candidate is similar to graphs of ransomware incidents.

14. The method of claim 6, wherein the method comprises boosting the incrimination confidence based on at least the following incrimination confidence boost condition: a local sub-organization-level incrimination logic determines that a particular machine of the organization is under ransomware attack, and a computational entity of the incrimination candidate is also found on at least a specified number of other machines of the organization within a specified time period.

15. The method of claim 6, wherein the method comprises boosting the incrimination confidence based on at least the following incrimination confidence boost condition: at least a specified number of different sub-organization-level incrimination logics and at least a specified number of different machines of the organization are identified in cybersecurity alerts within a specified time period.

16. A computer-readable storage device configured with data and instructions which upon execution by a processor cause a computing system to perform a method for protecting an organization against a ransomware attack by an organizational ransomware, the organizational ransomware being a particular kind of malware which is designed to spread among multiple machines without detection and then present a ransom demand, the method comprising:
- submitting at least one incrimination candidate to an organization-level incrimination logic via an organization-level incrimination logic interface and in response receiving an organization-level incrimination boost attempt result, the organization-level incrimination logic configured to detect a spike in cybersecurity alerts which occur collectively on at least a specified number of machines of the organization or on at least a specified percentage of machines of the organization, or both, the incrimination candidate comprising a set of one or more attack indication computational entities;
- submitting at least one incrimination candidate to at least one sub-organization-level incrimination logic via at least one sub-organization-level incrimination interface and in response receiving at least one sub-organization-level incrimination boost attempt result, the sub-organization-level incrimination logic configured to detect a cybersecurity anomaly on at least one machine of the organization without regard to the organization-level incrimination logic specified number of machines of the organization and without regard to the organization-level incrimination logic specified percentage of machines of the organization;
- ascertaining that the incrimination boost attempt results collectively indicate a boost in an incrimination confidence past a specified threshold; and
- in response to the ascertaining, notifying an intervention mechanism that a computational entity of the incrimination candidate is an incriminated computational entity which is compromised by the organizational ransomware;
- wherein the method comprises execution of a two-level approach which combines consideration of alerts from a group of machines by using the organization-level incrimination logic with consideration of alerts from fewer machines or from only a single machine by using the at least one sub-organization-level incrimination logic, in order to detect organizational ransomware.

17. The computer-readable storage device of claim 16, wherein the method further comprises performing at least one of the following graph classification algorithms:
- a graph neural network algorithm; or
- a graph statistical anomaly detection algorithm.

18. The computer-readable storage device of claim 16, wherein the method comprises performing a local incrimination logic sequence which includes:
- collecting an incriminated file from the at least one cybersecurity alert for a particular machine, and searching other machines of the organization for a copy of the incriminated file.

19. The computer-readable storage device of claim 16, wherein the method comprises performing a local incrimination logic sequence which includes: checking a precision of the at least one cybersecurity alert for a particular machine, and searching the particular machine for a remoting connection.

20. The computer-readable storage device of claim 16, wherein the method comprises performing a local incrimination logic sequence which includes: discerning an aggregated process tree alerts score of the at least one cybersecurity alert for a particular machine, and searching the particular machine for a remoting connection.

* * * * *